United States Patent
Wang et al.

(10) Patent No.: US 10,608,804 B2
(45) Date of Patent: *Mar. 31, 2020

(54) DATA TRANSMISSION METHOD, DEVICE, AND SYSTEM

(71) Applicant: Huawei Technologies Co., Ltd., Shenzhen (CN)

(72) Inventors: Da Wang, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 122 days.

This patent is subject to a terminal disclaimer.

(21) Appl. No.: 15/544,820

(22) PCT Filed: Jan. 19, 2015

(86) PCT No.: PCT/CN2015/071006
§ 371 (c)(1),
(2) Date: Jul. 19, 2017

(87) PCT Pub. No.: WO2016/115660
PCT Pub. Date: Jul. 28, 2016

(65) Prior Publication Data
US 2018/0019856 A1   Jan. 18, 2018

(51) Int. Cl.
*H04L 5/00* (2006.01)
*H04W 72/04* (2009.01)
*H04W 72/12* (2009.01)

(52) U.S. Cl.
CPC .......... *H04L 5/0064* (2013.01); *H04L 5/0007* (2013.01); *H04L 5/0044* (2013.01);
(Continued)

(58) Field of Classification Search
None
See application file for complete search history.

(56) References Cited

U.S. PATENT DOCUMENTS

2012/0039284 A1   2/2012   Barbieri et al.
2013/0308563 A1   11/2013   Xiao et al.
(Continued)

FOREIGN PATENT DOCUMENTS

CN   101909305 A   12/2010
CN   103155669 A   6/2013
(Continued)

OTHER PUBLICATIONS

Machine Translation and Abstract of Chinese Publication No. CN101909305, Dec. 8, 2010, 16 pages.
(Continued)

*Primary Examiner* — Ayaz R Sheikh
*Assistant Examiner* — Mariela Vidal Carpio
(74) *Attorney, Agent, or Firm* — Conley Rose, P.C.

(57) ABSTRACT

A data transmission method for data transmission, including obtaining, by a network device, a quantity of physical resource blocks (PRBs) that are occupied by first data carried in a first subframe, where the quantity of PRBs that are occupied by the first data carried in the first subframe is preconfigured, or may be determined by the network device or user equipment, determining a first transport block size (TBS) according to the quantity of PRBs that are occupied by the first data carried in the first subframe, performing, according to the first TBS, modulation and coding on the first data carried in the first subframe and first data carried in a second subframe, and sending the first subframe and the second subframe to the user equipment.

15 Claims, 4 Drawing Sheets

(52) U.S. Cl.
CPC ....... *H04L 5/0087* (2013.01); *H04W 72/0473* (2013.01); *H04W 72/1278* (2013.01)

(56) References Cited

U.S. PATENT DOCUMENTS

| | | |
|---|---|---|
| 2014/0036853 A1 | 2/2014 | Kim et al. |
| 2014/0112289 A1 | 4/2014 | Kim et al. |
| 2015/0043480 A1* | 2/2015 | Lee ................... H04L 5/0055 370/329 |
| 2015/0043526 A1 | 2/2015 | Wang |
| 2015/0117396 A1 | 4/2015 | Wang et al. |
| 2016/0007357 A1 | 1/2016 | Yano et al. |
| 2017/0223686 A1* | 8/2017 | You ................... H04L 5/0048 |

FOREIGN PATENT DOCUMENTS

| | | |
|---|---|---|
| CN | 103534969 A | 1/2014 |
| CN | 103547340 A | 1/2014 |
| EP | 3209057 A1 | 8/2017 |
| WO | 2010012239 A1 | 2/2010 |
| WO | 2012078565 A1 | 6/2012 |
| WO | 2013176827 A1 | 11/2013 |
| WO | 2014147673 A1 | 9/2014 |
| WO | 2016074194 A1 | 5/2016 |

OTHER PUBLICATIONS

"3rd Generation Partnership Project; Technical Specification Group Radio Access Network; Evolved Universal Terrestrial Radio Access (E-UTRA); Physical layer procedures (Release 12)," 3GPP TS 36.213 V12.4.0, Technical Specification, Dec. 2014, 225 pages.

Foreign Communication From a Counterpart Application, PCT Application No. PCT/CN2015/071006, English Translation of International Search Report dated Sep. 2, 2015, 2 pages.

Foreign Communication From a Counterpart Application, PCT Application No. PCT/CN2015/071006, English Translation of Written Opinion dated Sep. 2, 2015, 6 pages.

Foreign Communication From a Counterpart Application, European Application No. 15878338.1, Extended European Search Report dated Nov. 27, 2017, 10 pages.

Panasonic, "Discussion on flexible transmission time in LAA," R1-150318, 3GPP TSG RAN WG1 Meeting #80, Athens, Greece, Feb. 9-13, 2015, 6 pages.

Foreign Communication From a Counterpart Application, Chinese Application No. 201580052261.0, Chinese Office Action dated Nov. 4, 2019, 10 pages.

Intel Corporation, "Extended Subframes and (e)PDCCH for LAA downlink," R1-150090, 3GPP TSG RAN WG1 Meeting #80, Athens, Greece, Feb. 9-13, 2015, 7 pages.

CMCC, "Fractional Subframe Transmission for LBE-based LAA," R1-150440, 3GPP TSG-RAN WG1 #80, Athens, Greece, Feb. 9-13, 2015, 4 pages.

Foreign Communication From a Counterpart Application, Korean Application No. 10-2017-7029463, Korean Office Action dated Oct. 29, 2019, 5 pages.

Foreign Communication From a Counterpart Application, Korean Application No. 10-2017-7029463, English Translation of Korean Office Action dated Nov. 8, 2019, 6 pages.

* cited by examiner

DATA TRANSMISSION METHOD, DEVICE, AND SYSTEM

CROSS-REFERENCE TO RELATED APPLICATION

This application is a U.S. National Stage of International Patent Application No. PCT/CN2015/071006 filed on Jan. 19, 2015, which is hereby incorporated by reference in its entirety.

TECHNICAL FIELD

The present disclosure relates to the communications field, and in particular, to a data transmission method, a device, and a system.

BACKGROUND

In a wireless communications network, devices need to transmit information using a frequency resource. The frequency resource is also referred to as a spectrum. Spectra may be classified into a licensed spectrum and an unlicensed spectrum. The licensed spectrum is a dedicated frequency resource of some operators. The unlicensed spectrum is a shared frequency resource in the wireless communications network. With development of communications technologies, there is an ever-increasing amount of information transmitted in the wireless communications network. Preemption of the unlicensed spectrum for information transmission may increase a data throughput in the wireless communications network to better meet a requirement of a user.

However, in other approaches, a device may preempt a channel of an unlicensed spectrum to send data at a random moment. Consequently, the moment at which the device sends the data may not be a start moment of a complete subframe. As shown in FIG. 1, modulation and coding, and data transmission cannot be performed on an incomplete subframe.

SUMMARY

Embodiments of the present disclosure provide a data transmission method, a device, and a system in order to resolve a prior-art problem that modulation and coding, and data transmission cannot be performed on an incomplete subframe.

To achieve the foregoing objective, the following technical solutions are used in the embodiments of the present disclosure.

According to a first aspect, a data transmission method includes obtaining, by a network device, a quantity of physical resource blocks (PRBs) that are occupied by first data carried in a first subframe, where the first data is data that is sent by the network device to user equipment, determining, by the network device, a first transport block size (TBS) or a second TBS according to the quantity of PRBs that are occupied by the first data carried in the first subframe, where the second TBS includes a TBS in the first subframe and a TBS in a second subframe, performing, by the network device according to the first TBS or the second TBS, modulation and coding on the first data carried in the first subframe and the first data carried in the second subframe, where the first subframe and the second subframe are adjacent subframes, and sending, by the network device, the first subframe and the second subframe to the user equipment, where the first subframe is sent after the second subframe, the first subframe includes M orthogonal frequency division multiplexing (OFDM) symbols, the second subframe includes N OFDM symbols, M and N are positive integers, and M≥N.

With reference to the first aspect, in a first possible implementation of the first aspect, the determining, by the network device, a first TBS according to the quantity of PRBs that are occupied by the first data carried in the first subframe includes determining, by the network device according to a first formula S=F(s×a), a quantity S of PRBs that are jointly occupied by the first data carried in the first subframe and the first data carried in the second subframe, where s is the quantity of PRBs that are occupied by the first data carried in the first subframe, the function F is used for performing rounding up, rounding down, or rounding off, and a is a real number greater than 1, and determining, by the network device, the first TBS according to the quantity of PRBs that are jointly occupied by the first data carried in the first subframe and the first data carried in the second subframe.

With reference to the first aspect, in a second possible implementation of the first aspect, determining, by the network device, a first TBS according to the quantity of PRBs that are occupied by the first data carried in the first subframe includes determining, by the network device, the first TBS T according to a second formula T=F(t×a), where t is the TBS in the first subframe, the TBS in the first subframe is a TBS corresponding to the quantity of PRBs that are occupied by the first data carried in the first subframe, the function F is used for performing rounding up, rounding down, or rounding off, and a is a real number greater than 1.

With reference to the first possible implementation of the first aspect or the first possible implementation of the first aspect, in a third possible implementation of the first aspect, a is $(M_1+M_2)/M_2$, $M_1$ is used to indicate a quantity of PRBs or a quantity of OFDM symbols that are occupied by the first data carried in the second subframe and/or control information carried in the second subframe, and $M_2$ is used to indicate a quantity of PRBs or a quantity of OFDM symbols that are occupied by the first data carried in the first subframe and/or control information carried in the first subframe.

With reference to the first aspect, in a fourth possible implementation of the first aspect, determining, by the network device, a second TBS according to the quantity of PRBs that are occupied by the first data carried in the first subframe includes determining, by the network device according to a third formula L=F(l×a), a quantity L of PRBs that are occupied by the first data carried in the second subframe, where l is the quantity of PRBs that are occupied by the first data carried in the first subframe, the function F is used for performing rounding up, rounding down, or rounding off, and a is a positive real number not greater than 1, determining, by the network device, the TBS in the second subframe according to the quantity of PRBs that are occupied by the first data carried in the second subframe, and determining, by the network device, the TBS in the first subframe according to the quantity of PRBs that are occupied by the first data carried in the first subframe.

With reference to the first aspect, in a fifth possible implementation of the first aspect, the determining, by the network device, a second TBS according to the quantity of PRBs that are occupied by the first data carried in the first subframe includes determining, by the network device, the second TBS P in the second subframe according to a fourth formula P=F(p×a), where p is the TBS in the first subframe, the TBS in the first subframe is a TBS corresponding to the quantity of PRBs that are occupied by the first data carried in the first subframe, the function F is used for performing rounding up, rounding down, or rounding off, and a is a positive real number not greater than 1.

With reference to the fourth possible implementation of the first aspect or the fifth possible implementation of the first aspect, in a sixth possible implementation of the first aspect, a is $M_1/M_2$, $M_1$ is used to indicate a quantity of PRBs or a quantity of OFDM symbols that are occupied by the first data carried in the second subframe and/or control information carried in the second subframe, and $M_2$ is used to indicate a quantity of PRBs or a quantity of OFDM symbols that are occupied by the first data carried in the first subframe and/or control information carried in the first subframe.

With reference to any one of the first aspect to the sixth possible implementation of the first aspect, in a seventh possible implementation of the first aspect, the method further includes sending, by the network device, a to the user equipment.

With reference to any one of the first aspect to the seventh possible implementation of the first aspect, in an eighth possible implementation of the first aspect, determining, by the network device, a first TBS or a second TBS according to the quantity of PRBs that are occupied by the first data carried in the first subframe includes creating, by the network device, a first table for the TBS in the first subframe and the TBS in the second subframe according to a, or creating, by the network device, a first table for the TBS in the first subframe and the first TBS according to a, or creating, by the network device according to a, a first table for the quantity of PRBs that are occupied by the first data carried in the first subframe and the quantity of PRBs that are occupied by the first data carried in the second subframe, or creating, by the network device according to a, a first table for the quantity of PRBs that are occupied by the first data carried in the first subframe and the quantity of PRBs that are jointly occupied by the first data carried in the first subframe and the first data carried in the second subframe, and determining, by the network device, the first TBS or the second TBS according to the first table.

With reference to any one of the first aspect to the eighth possible implementation of the first aspect, in a ninth possible implementation of the first aspect, the second subframe is a subframe on an unlicensed spectrum.

With reference to any one of the first aspect to the ninth possible implementation of the first aspect, in a tenth possible implementation of the first aspect, downlink control information (DCI) of the first subframe includes a modulation and coding parameter that is used to indicate the first data carried in the first subframe, and the modulation and coding parameter of the first data carried in the first subframe includes a modulation and coding scheme (MCS) level of the first data carried in the first subframe, the quantity of PRBs that are occupied by the first data carried in the first subframe, and locations of the PRBs that are occupied by the first data carried in the first subframe.

With reference to the tenth possible implementation of the first aspect, in an eleventh possible implementation of the first aspect, the DCI of the first subframe further includes a modulation and coding parameter that is used to indicate the first data carried in the second subframe, and the modulation and coding parameter of the first data carried in the second subframe includes an MCS level of the first data carried in the second subframe, the quantity of PRBs that are occupied by the first data carried in the second subframe, and locations of the PRBs that are occupied by the first data carried in the second subframe.

With reference to any one of the first aspect to the eleventh possible implementation of the first aspect, in a twelfth possible implementation of the first aspect, the method further includes receiving, by the network device, first feedback information sent by the user equipment, where the first feedback information is used to indicate whether the user equipment correctly receives the first subframe and the second subframe.

According to a second aspect, a data transmission method includes receiving, by the user equipment, a first subframe and a second subframe that are adjacent to each other and that are sent by a network device, where the first subframe is sent after the second subframe, the first subframe includes M OFDM symbols, the second subframe includes N OFDM symbols, M and N are positive integers, and M≥N, obtaining, by the user equipment, a quantity of PRBs that are occupied by the first data carried in the first subframe, where the first data is data that is sent by the network device to the user equipment, determining, by the user equipment, a first TBS or a second TBS according to the quantity of PRBs that are occupied by the first data carried in the first subframe, where the second TBS includes a TBS in the first subframe and a TBS in the second subframe, and performing, by the user equipment according to the first TBS or the second TBS, demodulation and decoding on the first data carried in the first subframe and the first data carried in the second subframe.

With reference to the second aspect, in a first possible implementation of the second aspect, determining, by the user equipment, a first TBS according to the quantity of PRBs that are occupied by the first data carried in the first subframe includes determining, by the user equipment according to a first formula S=F(s×a), a quantity S of PRBs that are jointly occupied by the first data carried in the first subframe and the first data carried in the second subframe, where s is the quantity of PRBs that are occupied by the first data carried in the first subframe, the function F is used for performing rounding up, rounding down, or rounding off, and a is a real number greater than 1, and determining, by the user equipment, the first TBS according to the quantity of PRBs that are jointly occupied by the first data carried in the first subframe and the first data carried in the second subframe.

With reference to the second aspect, in a second possible implementation of the second aspect, determining, by the user equipment, a first TBS according to the quantity of PRBs that are occupied by the first data carried in the first subframe includes determining, by the user equipment, the first TBS T according to a second formula T=F(t×a), where t is the TBS in the first subframe, the TBS in the first subframe is a TBS corresponding to the quantity of PRBs that are occupied by the first data carried in the first subframe, the function F is used for performing rounding up, rounding down, or rounding off, and a is a real number greater than 1.

With reference to the first possible implementation of the second aspect or the first possible implementation of the second aspect, in a third possible implementation of the second aspect, a is $(M_1+M_2)/M_2$, $M_1$ is used to indicate a quantity of PRBs or a quantity of OFDM symbols that are occupied by the first data carried in the second subframe and/or control information carried in the second subframe, and $M_2$ is used to indicate a quantity of PRBs or a quantity of OFDM symbols that are occupied by the first data carried in the first subframe and/or control information carried in the first subframe.

With reference to the second aspect, in a fourth possible implementation of the second aspect, determining, by the user equipment, a second TBS according to the quantity of PRBs that are occupied by the first data carried in the first subframe includes determining, by the user equipment according to a third formula L=F(l×a), a quantity L of PRBs that are occupied by the first data carried in the second subframe, where l is the quantity of PRBs that are occupied by the first data carried in the first subframe, the function F is used for performing rounding up, rounding down, or rounding off, and a is a positive real number not greater than 1, determining, by the user equipment, the TBS in the second subframe according to the quantity of PRBs that are occupied by the first data carried in the second subframe, and determining, by the user equipment, the TBS in the first subframe according to the quantity of PRBs that are occupied by the first data carried in the first subframe.

With reference to the second aspect, in a fifth possible implementation of the second aspect, the determining, by the user equipment, a second TBS according to the quantity of PRBs that are occupied by the first data carried in the first subframe includes determining, by the user equipment, the second TBS P according to a fourth formula P=F(p×a), where p is the TBS in the first subframe, the TBS in the first subframe is a TBS corresponding to the quantity of PRBs that are occupied by the first data carried in the first subframe, the function F is used for performing rounding up, rounding down, or rounding off, and a is a positive real number not greater than 1.

With reference to the fourth possible implementation of the second aspect or the fifth possible implementation of the second aspect, in a sixth possible implementation of the second aspect, a is $M_1/M_2$, $M_1$ is used to indicate a quantity of PRBs or a quantity of OFDM symbols that are occupied by the first data carried in the second subframe and/or control information carried in the second subframe, and $M_2$ is used to indicate a quantity of PRBs or a quantity of OFDM symbols that are occupied by the first data carried in the first subframe and/or control information carried in the first subframe.

With reference to any one of the second aspect to the sixth possible implementation of the second aspect, in a seventh possible implementation of the second aspect, the method further includes receiving, by the user equipment, a sent by the network device, and determining, by the user equipment, a first TBS or a second TBS according to the quantity of PRBs that are occupied by the first data carried in the first subframe includes creating, by the user equipment, a first table for the TBS in the first subframe and the TBS in the second subframe according to a, or creating, by the user equipment, a first table for the TBS in the first subframe and the first TBS according to a, or creating, by the user equipment according to a, a first table for the quantity of PRBs that are occupied by the first data carried in the first subframe and the quantity of PRBs that are occupied by the first data carried in the second subframe, or creating, by the user equipment according to a, a first table for the quantity of PRBs that are occupied by the first data carried in the first subframe and the quantity of PRBs that are jointly occupied by the first data carried in the first subframe and the first data carried in the second subframe, and determining, by the user equipment, the first TBS or the second TBS according to the first table.

With reference to any one of the second aspect to the seventh possible implementation of the second aspect, in an eighth possible implementation of the second aspect, the second subframe is a subframe on an unlicensed spectrum.

With reference to any one of the second aspect to the eighth possible implementation of the second aspect, in a ninth possible implementation of the second aspect, DCI of the first subframe includes a modulation and coding parameter that is used to indicate the first data carried in the first subframe, and the modulation and coding parameter of the first data carried in the first subframe includes an MCS level of the first data carried in the first subframe, the quantity of PRBs that are occupied by the first data carried in the first subframe, and locations of the PRBs that are occupied by the first data carried in the first subframe.

With reference to the ninth possible implementation of the second aspect, in a tenth possible implementation of the second aspect, the DCI of the first subframe further includes a modulation and coding parameter that is used to indicate the first data carried in the second subframe, and the modulation and coding parameter of the first data carried in the second subframe includes an MCS level of the first data carried in the second subframe, the quantity of PRBs that are occupied by the first data carried in the second subframe, and locations of the PRBs that are occupied by the first data carried in the second subframe.

With reference to any one of the second aspect to the tenth possible implementation of the second aspect, in an eleventh possible implementation of the second aspect, the method further includes sending, by the user equipment, first feedback information to the network device, where the first feedback information is used to indicate whether the user equipment correctly receives the first subframe and the second subframe.

According to a third aspect, a network device includes an obtaining unit configured to obtain a quantity of PRBs that are occupied by first data carried in a first subframe, where the first data is data that is sent by the network device to user equipment, a modulation and coding unit configured to determine a first TBS or a second TBS according to the quantity that is obtained by the obtaining unit and that is of PRBs that are occupied by the first data carried in the first subframe, where the second TBS includes a TBS in the first subframe and a TBS in a second subframe, and perform, according to the first TBS or the second TBS, modulation and coding on the first data carried in the first subframe and the first data carried in the second subframe, where the first subframe and the second subframe are adjacent subframes, and a sending unit configured to send the first subframe and the second subframe to the user equipment, where the first subframe is sent after the second subframe, the first subframe includes M OFDM symbols, the second subframe includes N OFDM symbols, M and N are positive integers, and M≥N.

With reference to the third aspect, in a first possible implementation of the third aspect, the modulation and coding unit is further configured to determine, according to a first formula S=F(s×a), a quantity S of PRBs that are jointly occupied by the first data carried in the first subframe and the first data carried in the second subframe, where s is the quantity of PRBs that are occupied by the first data carried in the first subframe, the function F is used for performing rounding up, rounding down, or rounding off, and a is a real number greater than 1, and determine the first TBS according to the quantity of PRBs that are jointly occupied by the first data carried in the first subframe and the first data carried in the second subframe.

With reference to the third aspect, in a second possible implementation of the third aspect, the modulation and coding unit is further configured to determine the first TBS T according to a second formula T=F(t×a), where t is the TBS in the first subframe, the TBS in the first subframe is a TBS corresponding to the quantity of PRBs that are occupied by the first data carried in the first subframe, the function F is used for performing rounding up, rounding down, or rounding off, and a is a real number greater than 1.

With reference to the first possible implementation of the third aspect or the second possible implementation of the third aspect, in a third possible implementation of the third aspect, a is $(M_1+M_2)/M_2$, $M_1$ is used to indicate a quantity of PRBs or a quantity of OFDM symbols that are occupied by the first data carried in the second subframe and/or control information carried in the second subframe, and $M_2$ is used to indicate a quantity of PRBs or a quantity of OFDM symbols that are occupied by the first data carried in the first subframe and/or control information carried in the first subframe.

With reference to the third aspect, in a fourth possible implementation of the third aspect, the modulation and coding unit is further configured to determine, according to a third formula L=F(l×a), a quantity L of PRBs that are occupied by the first data carried in the second subframe, where l is the quantity of PRBs that are occupied by the first data carried in the first subframe, the function F is used for performing rounding up, rounding down, or rounding off, and a is a positive real number not greater than 1, determine the TBS in the second subframe according to the quantity of PRBs that are occupied by the first data carried in the second subframe, and determine the TBS in the first subframe according to the quantity of PRBs that are occupied by the first data carried in the first subframe.

With reference to the third aspect, in a fifth possible implementation of the third aspect, the modulation and coding unit is further configured to determine the second TBS P according to a fourth formula P=F(p×a), where p is the TBS in the first subframe, the TBS in the first subframe is a TBS corresponding to the quantity of PRBs that are occupied by the first data carried in the first subframe, the function F is used for performing rounding up, rounding down, or rounding off, and a is a positive real number not greater than 1.

With reference to the fourth possible implementation of the third aspect or the fifth possible implementation of the third aspect, in a sixth possible implementation of the third aspect, a is $M_1/M_2$, $M_1$ is used to indicate a quantity of PRBs or a quantity of OFDM symbols that are occupied by the first data carried in the second subframe and/or control information carried in the second subframe, and $M_2$ is used to indicate a quantity of PRBs or a quantity of OFDM symbols that are occupied by the first data carried in the first subframe and/or control information carried in the first subframe.

With reference to any one of the third aspect to the sixth possible implementation of the third aspect, in a seventh possible implementation of the third aspect, the sending unit is further configured to send a to the user equipment.

With reference to any one of the third aspect to the seventh possible implementation of the third aspect, in an eighth possible implementation of the third aspect, the modulation and coding unit is further configured to create a first table for the TBS in the first subframe and the TBS in the second subframe according to a, or create a first table for the TBS in the first subframe and the first TBS according to a, or create, according to a, a first table for the quantity of PRBs that are occupied by the first data carried in the first subframe and the quantity of PRBs that are occupied by the first data carried in the second subframe, or create, according to a, a first table for the quantity of PRBs that are occupied by the first data carried in the first subframe and the quantity of PRBs that are jointly occupied by the first data carried in the first subframe and the first data carried in the second subframe, and determine the first TBS or the second TBS according to the first table.

With reference to any one of the third aspect to the eighth possible implementation of the third aspect, in a ninth possible implementation of the third aspect, the second subframe is a subframe on an unlicensed spectrum.

With reference to any one of the third aspect to the ninth possible implementation of the third aspect, in a tenth possible implementation of the third aspect, DCI of the first subframe includes a modulation and coding parameter that is used to indicate the first data carried in the first subframe, and the modulation and coding parameter of the first data carried in the first subframe includes an MCS level of the first data carried in the first subframe, the quantity of PRBs that are occupied by the first data carried in the first subframe, and locations of the PRBs that are occupied by the first data carried in the first subframe.

With reference to the tenth possible implementation of the third aspect, in an eleventh possible implementation of the third aspect, the DCI of the first subframe further includes a modulation and coding parameter that is used to indicate the first data carried in the second subframe, and the modulation and coding parameter of the first data carried in the second subframe includes an MCS level of the first data carried in the second subframe, the quantity of PRBs that are occupied by the first data carried in the second subframe, and locations of the PRBs that are occupied by the first data carried in the second subframe.

With reference to any one of the third aspect to the eleventh possible implementation of the third aspect, in a twelfth possible implementation of the third aspect, the network device further includes a receiving unit configured to receive first feedback information sent by the user equipment, where the first feedback information is used to indicate whether the user equipment correctly receives the first subframe and the second subframe.

According to a fourth aspect, user equipment includes a receiving unit configured to receive a first subframe and a second subframe that are adjacent to each other and that are sent by a network device, where the first subframe is sent after the second subframe, the first subframe includes M OFDM symbols, the second subframe includes N OFDM symbols, M and N are positive integers, and M≥N, an obtaining unit configured to obtain a quantity of PRBs that are occupied by first data carried in the first subframe, where the first data is data that is sent by the network device to the user equipment, and a demodulation and decoding unit configured to determine a first TBS or a second TBS according to the quantity that is obtained by the obtaining unit and that is of PRBs that are occupied by the first data carried in the first subframe, where the second TBS includes a TBS in the first subframe and a TBS in the second subframe, and perform, according to the first TBS or the second TBS, demodulation and decoding on the first data carried in the first subframe and the first data carried in the second subframe.

With reference to the fourth aspect, in a first possible implementation of the fourth aspect, the demodulation and decoding unit is further configured to determine, according to a first formula S=F(s×a), a quantity S of PRBs that are jointly occupied by the first data carried in the first subframe and the first data carried in the second subframe, where s is the quantity of PRBs that are occupied by the first data carried in the first subframe, the function F is used for performing rounding up, rounding down, or rounding off, and a is a real number greater than 1, and determine the first TBS according to the quantity of PRBs that are jointly occupied by the first data carried in the first subframe and the first data carried in the second subframe.

With reference to the fourth aspect, in a second possible implementation of the fourth aspect, the demodulation and decoding unit is further configured to determine the first TBS T according to a second formula T=F(t×a), where t is the TBS in the first subframe, the TBS in the first subframe is a TBS corresponding to the quantity of PRBs that are occupied by the first data carried in the first subframe, the function F is used for performing rounding up, rounding down, or rounding off, and a is a real number greater than 1.

With reference to the first possible implementation of the fourth aspect or the first possible implementation of the fourth aspect, in a third possible implementation of the fourth aspect, a is $(M_1+M_2)/M_2$, $M_1$ is used to indicate a quantity of PRBs or a quantity of OFDM symbols that are occupied by the first data carried in the second subframe and/or control information carried in the second subframe, and $M_2$ is used to indicate a quantity of PRBs or a quantity of OFDM symbols that are occupied by the first data carried in the first subframe and/or control information carried in the first subframe.

With reference to the fourth aspect, in a fourth possible implementation of the fourth aspect, the demodulation and decoding unit is further configured to determine, according to a third formula L=F(l×a), a quantity L of PRBs that are occupied by the first data carried in the second subframe, where l is the quantity of PRBs that are occupied by the first data carried in the first subframe, the function F is used for performing rounding up, rounding down, or rounding off, and a is a positive real number not greater than 1, determine the TBS in the second subframe according to the quantity of PRBs that are occupied by the first data carried in the second subframe, and determine the TBS in the first subframe according to the quantity of PRBs that are occupied by the first data carried in the first subframe.

With reference to the fourth aspect, in a fifth possible implementation of the fourth aspect, the demodulation and decoding unit is further configured to determine the second TBS P according to a fourth formula P=F(p×a), where p is the TBS in the first subframe, the TBS in the first subframe is a TBS corresponding to the quantity of PRBs that are occupied by the first data carried in the first subframe, the function F is used for performing rounding up, rounding down, or rounding off, and a is a positive real number not greater than 1.

With reference to the fourth possible implementation of the fourth aspect or the fifth possible implementation of the fourth aspect, in a sixth possible implementation of the fourth aspect, a is $M_1/M_2$, $M_1$ is used to indicate a quantity of PRBs or a quantity of OFDM symbols that are occupied by the first data carried in the second subframe and/or control information carried in the second subframe, and $M_2$ is used to indicate a quantity of PRBs or a quantity of OFDM symbols that are occupied by the first data carried in the first subframe and/or control information carried in the first subframe.

With reference to any one of the fourth aspect to the sixth possible implementation of the fourth aspect, in a seventh possible implementation of the fourth aspect, the receiving unit is further configured to receive a sent by the network device, and the demodulation and decoding unit is further configured to create a first table for the TBS in the first subframe and the TBS in the second subframe according to a, create a first table for the TBS in the first subframe and the first TBS according to a, create, according to a, a first table for the quantity of PRBs that are occupied by the first data carried in the first subframe and the quantity of PRBs that are occupied by the first data carried in the second subframe, or create, according to a, a first table for the quantity of PRBs that are occupied by the first data carried in the first subframe and the quantity of PRBs that are jointly occupied by the first data carried in the first subframe and the first data carried in the second subframe, and determine the first TBS or the second TBS according to the first table.

With reference to any one of the fourth aspect to the seventh possible implementation of the fourth aspect, in an eighth possible implementation of the fourth aspect, the second subframe is a subframe on an unlicensed spectrum.

With reference to any one of the fourth aspect to the eighth possible implementation of the fourth aspect, in a ninth possible implementation of the fourth aspect, DCI of the first subframe includes a modulation and coding parameter that is used to indicate the first data carried in the first subframe, and the modulation and coding parameter of the first data carried in the first subframe includes an MCS level of the first data carried in the first subframe, the quantity of PRBs that are occupied by the first data carried in the first subframe, and locations of the PRBs that are occupied by the first data carried in the first subframe.

With reference to the ninth possible implementation of the fourth aspect, in a tenth possible implementation of the fourth aspect, the DCI of the first subframe further includes a modulation and coding parameter that is used to indicate the first data carried in the second subframe, and the modulation and coding parameter of the first data carried in the second subframe includes an MCS level of the first data carried in the second subframe, the quantity of PRBs that are occupied by the first data carried in the second subframe, and locations of the PRBs that are occupied by the first data carried in the second subframe.

With reference to any one of the fourth aspect to the tenth possible implementation of the fourth aspect, in an eleventh possible implementation of the fourth aspect, the user equipment further includes a sending unit configured to send first feedback information to the network device, where the first feedback information is used to indicate whether the user equipment correctly receives the first subframe and the second subframe.

According to a fifth aspect, a network device includes a processor, a memory, a bus, and a transmitter, where the processor, the memory, and the transmitter are connected to each other using the bus, where the processor is configured to obtain a quantity of PRBs that are occupied by the first data carried in a first subframe, where the first data is data that is sent by the network device to the user equipment, and determine a first TBS or a second TBS according to the quantity of PRBs that are occupied by the first data carried in the first subframe, where the second TBS includes a TBS in the first subframe and a TBS in a second subframe, and perform, according to the first TBS or the second TBS, modulation and coding on the first data carried in the first subframe and the first data carried in the second subframe, where the first subframe and the second subframe are adjacent subframes, and the transmitter is configured to send the first subframe and the second subframe to the user equipment, where the first subframe is sent after the second subframe, the first subframe includes M OFDM symbols, the second subframe includes N OFDM symbols, M and N are positive integers, and M≥N.

With reference to the fifth aspect, in a first possible implementation of the fifth aspect, the processor is further configured to determine, according to a first formula S=F(s×a), a quantity S of PRBs that are jointly occupied by the first data carried in the first subframe and the first data carried in the second subframe, where s is the quantity of PRBs that are occupied by the first data carried in the first subframe, the function F is used for performing rounding up, rounding down, or rounding off, and a is a real number greater than 1, and determine the first TBS according to the quantity of PRBs that are jointly occupied by the first data carried in the first subframe and the first data carried in the second subframe.

With reference to the fifth aspect, in a second possible implementation of the fifth aspect, the processor is further configured to determine the first TBS T according to a second formula T=F(t×a), where t is the TBS in the first subframe, the TBS in the first subframe is a TBS corresponding to the quantity of PRBs that are occupied by the first data carried in the first subframe, the function F is used for performing rounding up, rounding down, or rounding off, and a is a real number greater than 1.

With reference to the first possible implementation of the fifth aspect or the first possible implementation of the fifth aspect, in a third possible implementation of the fifth aspect, a is $(M_1+M_2)/M_2$, $M_1$ is used to indicate a quantity of PRBs or a quantity of OFDM symbols that are occupied by the first data carried in the second subframe and/or control information carried in the second subframe, and $M_2$ is used to indicate a quantity of PRBs or a quantity of OFDM symbols that are occupied by the first data carried in the first subframe and/or control information carried in the first subframe.

With reference to the fifth aspect, in a fourth possible implementation of the fifth aspect, the processor is further configured to determine, according to a third formula L=F(l×a), a quantity L of PRBs that are occupied by the first data carried in the second subframe, where l is the quantity of PRBs that are occupied by the first data carried in the first subframe, the function F is used for performing rounding up, rounding down, or rounding off, and a is a positive real number not greater than 1, determine the TBS in the second subframe according to the quantity of PRBs that are occupied by the first data carried in the second subframe, and determine the TBS in the first subframe according to the quantity of PRBs that are occupied by the first data carried in the first subframe.

With reference to the fifth aspect, in a fifth possible implementation of the fifth aspect, the processor is further configured to determine the second TBS P according to a fourth formula P=F(p×a), where p is the TBS in the first subframe, the TBS in the first subframe is a TBS corresponding to the quantity of PRBs that are occupied by the first data carried in the first subframe, the function F is used for performing rounding up, rounding down, or rounding off, and a is a positive real number not greater than 1.

With reference to the fourth possible implementation of the fifth aspect or the fifth possible implementation of the fifth aspect, in a sixth possible implementation of the fifth aspect, a is $M_1/M_2$, $M_1$ is used to indicate a quantity of PRBs or a quantity of OFDM symbols that are occupied by the first data carried in the second subframe and/or control information carried in the second subframe, and $M_2$ is used to indicate a quantity of PRBs or a quantity of OFDM symbols that are occupied by the first data carried in the first subframe and/or control information carried in the first subframe.

With reference to any one of the fifth aspect to the sixth possible implementation of the fifth aspect, in a seventh possible implementation of the fifth aspect, the transmitter is further configured to send a to the user equipment.

With reference to any one of the fifth aspect to the seventh possible implementation of the fifth aspect, in an eighth possible implementation of the fifth aspect, the processor is further configured to create a first table for the TBS in the first subframe and the TBS in the second subframe according to a, create a first table for the TBS in the first subframe and the first TBS according to a, create, according to a, a first table for the quantity of PRBs that are occupied by the first data carried in the first subframe and the quantity of PRBs that are occupied by the first data carried in the second subframe, or create, according to a, a first table for the quantity of PRBs that are occupied by the first data carried in the first subframe and the quantity of PRBs that are jointly occupied by the first data carried in the first subframe and the first data carried in the second subframe, and determine the first TBS or the second TBS according to the first table.

With reference to any one of the fifth aspect to the eighth possible implementation of the fifth aspect, in a ninth possible implementation of the fifth aspect, the second subframe is a subframe on an unlicensed spectrum.

With reference to any one of the fifth aspect to the ninth possible implementation of the fifth aspect, in a tenth possible implementation of the fifth aspect, DCI of the first subframe includes a modulation and coding parameter that is used to indicate the first data carried in the first subframe, and the modulation and coding parameter of the first data carried in the first subframe includes an MCS level of the first data carried in the first subframe, the quantity of PRBs that are occupied by the first data carried in the first subframe, and locations of the PRBs that are occupied by the first data carried in the first subframe.

With reference to the tenth possible implementation of the fifth aspect, in an eleventh possible implementation of the fifth aspect, the DCI of the first subframe further includes a modulation and coding parameter that is used to indicate the first data carried in the second subframe, and the modulation and coding parameter of the first data carried in the second subframe includes an MCS level of the first data carried in the second subframe, the quantity of PRBs that are occupied by the first data carried in the second subframe, and locations of the PRBs that are occupied by the first data carried in the second subframe.

With reference to any one of the fifth aspect to the eleventh possible implementation of the fifth aspect, in a twelfth possible implementation of the fifth aspect, the network device further includes a receiver configured to receive first feedback information sent by the user equipment, where the first feedback information is used to indicate whether the user equipment correctly receives the first subframe and the second subframe.

According to a sixth aspect, the user equipment includes a processor, a memory, a bus, and a receiver, where the processor, the memory, and the receiver are connected to each other using the bus, where the receiver is configured to receive a first subframe and a second subframe that are adjacent to each other and that are sent by a network device, where the first subframe is sent after the second subframe, the first subframe includes M OFDM symbols, the second subframe includes N OFDM symbols, M and N are positive integers, and M≥N, and the processor is configured to obtain a quantity of PRBs that are occupied by the first data carried in the first subframe, where the first data is data that is sent by the network device to the user equipment, determine a first TBS or a second TBS according to the quantity of PRBs that are occupied by the first data carried in the first subframe, where the second TBS includes a TBS in the first subframe and a TBS in the second subframe, and perform, according to the first TBS or the second TBS, demodulation and decoding on the first data carried in the first subframe and the first data carried in the second subframe.

With reference to the sixth aspect, in a first possible implementation of the sixth aspect, the processor is further configured to determine, according to a first formula S=F(s×a), a quantity S of PRBs that are jointly occupied by the first data carried in the first subframe and the first data carried in the second subframe, where s is the quantity of PRBs that are occupied by the first data carried in the first subframe, the function F is used for performing rounding up, rounding down, or rounding off, and a is a real number greater than 1, and determine the first TBS according to the quantity of PRBs that are jointly occupied by the first data carried in the first subframe and the first data carried in the second subframe.

With reference to the sixth aspect, in a second possible implementation of the sixth aspect, the processor is further configured to determine the first TBS T according to a second formula T=F(t×a), where t is the TBS in the first subframe, the TBS in the first subframe is a TBS corresponding to the quantity of PRBs that are occupied by the first data carried in the first subframe, the function F is used for performing rounding up, rounding down, or rounding off, and a is a real number greater than 1.

With reference to the first possible implementation of the sixth aspect or the first possible implementation of the sixth aspect, in a third possible implementation of the sixth aspect, a is $(M_1+M_2)/M_2$, $M_1$ is used to indicate a quantity of PRBs or a quantity of OFDM symbols that are occupied by the first data carried in the second subframe and/or control information carried in the second subframe, and $M_2$ is used to indicate a quantity of PRBs or a quantity of OFDM symbols that are occupied by the first data carried in the first subframe and/or control information carried in the first subframe.

With reference to the sixth aspect, in a fourth possible implementation of the sixth aspect, the processor is further configured to determine, according to a third formula L=F(l×a), a quantity L of PRBs that are occupied by the first data carried in the second subframe, where l is the quantity of PRBs that are occupied by the first data carried in the first subframe, the function F is used for performing rounding up, rounding down, or rounding off, and a is a positive real number not greater than 1, determine the TBS in the second subframe according to the quantity of PRBs that are occupied by the first data carried in the second subframe, and determine the TBS in the first subframe according to the quantity of PRBs that are occupied by the first data carried in the first subframe.

With reference to the sixth aspect, in a fifth possible implementation of the sixth aspect, the processor is further configured to determine the second TBS P according to a fourth formula P=F(p×a), where p is the TBS in the first subframe, the TBS in the first subframe is a TBS corresponding to the quantity of PRBs that are occupied by the first data carried in the first subframe, the function F is used for performing rounding up, rounding down, or rounding off, and a is a positive real number not greater than 1.

With reference to the fourth possible implementation of the sixth aspect or the sixth possible implementation of the fifth aspect, in a sixth possible implementation of the sixth aspect, a is $M_1/M_2$, $M_1$ is used to indicate a quantity of PRBs or a quantity of OFDM symbols that are occupied by the first data carried in the second subframe and/or control information carried in the second subframe, and $M_2$ is used to indicate a quantity of PRBs or a quantity of OFDM symbols that are occupied by the first data carried in the first subframe and/or control information carried in the first subframe.

With reference to any one of the sixth aspect to the sixth possible implementation of the sixth aspect, in a seventh possible implementation of the sixth aspect, the receiver is further configured to receive a sent by the network device, and the processor is further configured to create a first table for the TBS in the first subframe and the TBS in the second subframe according to a, create a first table for the TBS in the first subframe and the first TBS according to a, create, according to a, a first table for the quantity of PRBs that are occupied by the first data carried in the first subframe and the quantity of PRBs that are occupied by the first data carried in the second subframe, or create, according to a, a first table for the quantity of PRBs that are occupied by the first data carried in the first subframe and the quantity of PRBs that are jointly occupied by the first data carried in the first subframe and the first data carried in the second subframe, and determine the first TBS or the second TBS according to the first table.

With reference to any one of the sixth aspect to the seventh possible implementation of the sixth aspect, in an eighth possible implementation of the sixth aspect, the second subframe is a subframe on an unlicensed spectrum.

With reference to any one of the sixth aspect to the eighth possible implementation of the sixth aspect, in a ninth possible implementation of the sixth aspect, DCI of the first subframe includes a modulation and coding parameter that is used to indicate the first data carried in the first subframe, and the modulation and coding parameter of the first data carried in the first subframe includes an MCS level of the first data carried in the first subframe, the quantity of PRBs that are occupied by the first data carried in the first subframe, and locations of the PRBs that are occupied by the first data carried in the first subframe.

With reference to the ninth possible implementation of the sixth aspect, in a tenth possible implementation of the sixth aspect, the DCI of the first subframe further includes a modulation and coding parameter that is used to indicate the first data carried in the second subframe, and the modulation and coding parameter of the first data carried in the second subframe includes an MCS level of the first data carried in the second subframe, the quantity of PRBs that are occupied by the first data carried in the second subframe, and locations of the PRBs that are occupied by the first data carried in the second subframe.

With reference to any one of the sixth aspect to the tenth possible implementation of the sixth aspect, in an eleventh possible implementation of the sixth aspect, the user equipment further includes a transmitter configured to send first feedback information to the network device, where the first feedback information is used to indicate whether the user equipment correctly receives the first subframe and the second subframe.

According to a seventh aspect, a wireless network system includes a network device and user equipment, where the network device is the network device described in the third aspect or any possible implementation of the third aspect, and the user equipment is the user equipment described in the fourth aspect or any possible implementation of the fourth aspect, or the network device is the network device described in the fifth aspect or any possible implementation of the fifth aspect, and the user equipment is the user equipment described in the sixth aspect or any possible implementation of the sixth aspect.

According to the data transmission method, the device, and the system provided in the embodiments of the present disclosure, a network device obtains a quantity of PRBs that are occupied by first data carried in a first subframe, determines a first TBS or a second TBS according to the quantity of PRBs that are occupied by the first data carried in the first subframe, performs, according to the first TBS or the second TBS, modulation and coding on the first data carried in the first subframe and first data carried in a second subframe, and sends the first subframe and the second subframe to user equipment. This resolves a problem that modulation and coding, and data transmission cannot be performed on an incomplete subframe.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show only some embodiments of the present disclosure, and persons of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are only some but not all of the embodiments of the present disclosure. All other embodiments obtained by persons of ordinary skill in the art based on the embodiments of the present disclosure without creative efforts shall fall within the protection scope of the present disclosure.

It should be understood that the technical solutions of the embodiments of the present disclosure may be applied to various communications systems, for example, a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, a Universal Mobile Telecommunication System (UMTS), and a Worldwide Interoperability for Microwave Access (WIMAX) communications system.

It should be understood that in the embodiments of the present disclosure, user equipment includes but is not limited to a mobile station (MS), a mobile terminal, a mobile telephone, a handset, and portable equipment. The user equipment may communicate with one or more core networks using a radio access network (RAN). For example, the user equipment may be a mobile phone (or referred to as a "cellular" phone), or a computer with a wireless communication function, or the user equipment may be a portable, pocket-sized, handheld, computer built-in, or in-vehicle mobile apparatus.

In the embodiments of the present disclosure, a network device may be a base transceiver station (BTS) in GSM or CDMA, or may be a NodeB in WCDMA, or may be an evolved NodeB (eNB or e-NodeB) in LTE. This is not limited in the present disclosure.

Figure 2:
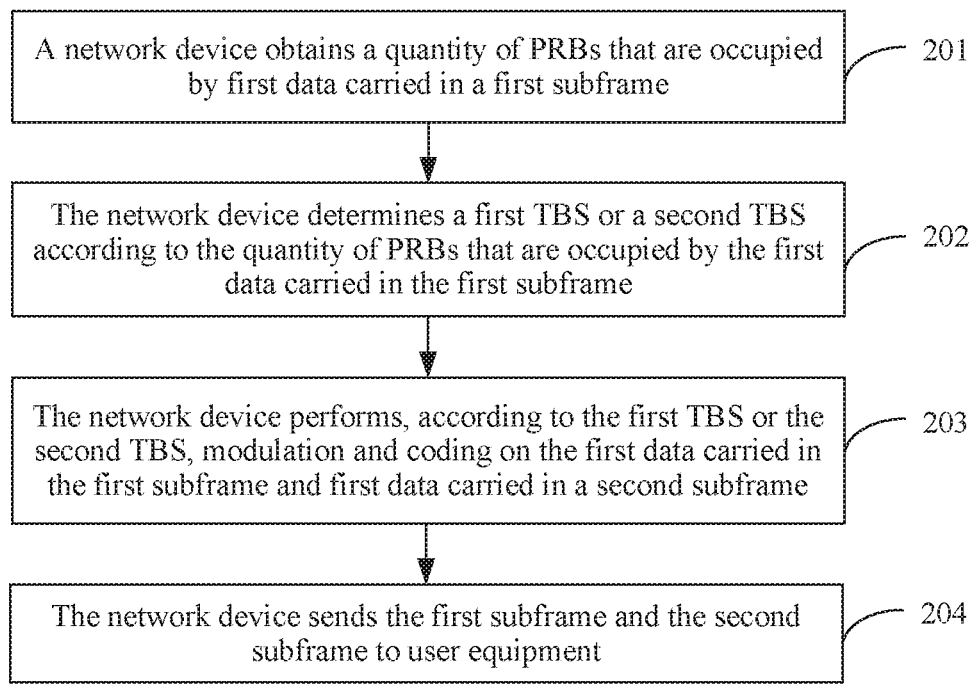
FIG. 2 is a schematic flowchart of a data transmission method according to an embodiment of the present disclosure.

An embodiment of the present disclosure provides a data transmission method. As shown in FIG. 2, the method includes the following steps.

Step 201: A network device obtains a quantity of PRBs that are occupied by first data carried in a first subframe.

The first data is data that is sent by the network device to user equipment. Optionally, the network device may further obtain locations of the PRBs that are occupied by the first data carried in the first subframe. Preferably, the quantity of PRBs that are occupied by the first data carried in the first subframe and the locations of the PRBs that are occupied by the first data carried in the first subframe are preconfigured, or may be determined by the network device or the user equipment.

Step 202: The network device determines a first TBS or a second TBS according to the quantity of PRBs that are occupied by the first data carried in the first subframe.

The second TBS includes a TBS in the first subframe and a TBS in a second subframe.

Step 203: The network device performs, according to the first TBS or the second TBS, modulation and coding on the first data carried in the first subframe and first data carried in a second subframe.

Figure 1:
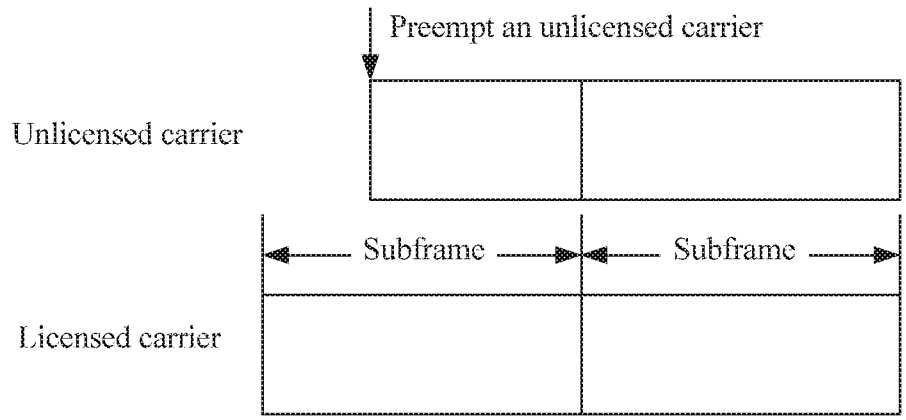
FIG. 1 is a schematic structural diagram of preempting an unlicensed spectrum subframe.

The first subframe and the second subframe are adjacent subframes. Optionally, as shown in FIG. 1, the first subframe is a subframe on an unlicensed spectrum, and a previous subframe of the first subframe is the second subframe on the unlicensed spectrum. That is, the second subframe may be an incomplete subframe, and the first subframe is a complete subframe. It should be noted that the second subframe may be a null subframe.

With reference to step 202, that the network device determines the first TBS or the second TBS, and performs, according to the first TBS or the second TBS, modulation and coding on the data carried in the first subframe and the data carried in the second subframe may be implemented in three implementations. Certainly, the three implementations are only examples for illustration, and do not indicate that the present disclosure is limited thereto.

1. In a first implementation, the network device uniformly performs modulation and coding on the first data carried in the first subframe and the first data carried in the second subframe.

Optionally, the network device determines, according to a first formula $S=F(s\times a)$, a quantity S of PRBs that are jointly occupied by the first data carried in the first subframe and the first data carried in the second subframe. Herein, s is the quantity of PRBs that are occupied by the first data carried in the first subframe, the function F is used for performing rounding up, rounding down, or rounding off, and a is a real number greater than 1. Herein, a is $(M_1+M_2)/M_2$, $M_1$ is used to indicate a quantity of PRBs or a quantity of OFDM symbols that are occupied by the first data carried in the second subframe and/or control information carried in the second subframe, and $M_2$ is used to indicate a quantity of PRBs or a quantity of OFDM symbols that are occupied by the first data carried in the first subframe and/or control information carried in the first subframe.

The network device determines the first TBS according to the quantity of PRBs that are jointly occupied by the first data carried in the first subframe and the first data carried in the second subframe, and uniformly performs, according to the first TBS, modulation and coding on the first data carried in the first subframe and the first data carried in the second subframe.

Preferably, the network device may determine the first TBS by searching Table 1, that is, determine the first TBS using an index of TBS ($I_{TBS}$) and a physical resource block quantity ($N_{PRB}$). An $I_{TBS}$ corresponds to an MCS level, and the $N_{PRB}$ corresponds to the quantity of PRBs that are jointly occupied by the first data carried in the first subframe and the first data carried in the second subframe.

For example, as shown in Table 1, when a calculated TBS corresponding to unified scheduling of the first subframe and the second subframe is 2152, in this case, 2280 closest to 2152 when an $N_{PRB}$ is 51 may be used as a TBS corresponding to the unified scheduling of the first subframe and the second subframe.

2. In a second implementation, the network device performs, according to the second TBS, modulation and coding separately on the first data carried in the first subframe and the first data carried in the second subframe. In this case, the network device performs, according to the TBS in the first subframe, modulation and coding on the first data carried in the first subframe, and performs, according to the TBS in the second subframe, modulation and coding on the first data carried in the second subframe. The TBS in the first subframe is a TBS corresponding to the quantity of PRBs that are occupied by the first data carried in the first subframe, and the TBS in the second subframe is a TBS corresponding to the quantity of PRBs that are occupied by the first data carried in the second subframe.

Further, optionally, the network device determines, according to a third formula $L=F(l\times a)$, the quantity L of PRBs that are occupied by the first data carried in the second subframe. Herein, l is the quantity of PRBs that are occupied by the first data carried in the first subframe, the function F is used for performing rounding up, rounding down, or rounding off, and a is a positive real number not greater than 1.

The network device determines the TBS in the second subframe according to the quantity of PRBs that are occupied by the first data carried in the second subframe.

The network device determines the TBS in the first subframe according to the quantity of PRBs that are occupied by the first data carried in the first subframe.

TABLE 1

| $I_{TBS}$ | $N_{PRB}$ | | | | | | | | | |
|---|---|---|---|---|---|---|---|---|---|---|
| | 51 | 52 | 53 | 54 | 55 | 56 | 57 | 58 | 59 | 60 |
| 0 | 1416 | 1416 | 1480 | 1480 | 1544 | 1544 | 1608 | 1608 | 1608 | 1672 |
| 1 | 1864 | 1864 | 1928 | 1992 | 1992 | 2024 | 2088 | 2088 | 2152 | 2152 |
| 2 | 2280 | 2344 | 2344 | 2408 | 2472 | 2536 | 2536 | 2600 | 2664 | 2664 |
| 3 | 2984 | 2984 | 3122 | 3112 | 3240 | 3240 | 3368 | 3368 | 3496 | 3496 |
| 4 | 3624 | 3752 | 3752 | 3880 | 4008 | 4008 | 4136 | 4136 | 4264 | 4264 |
| 5 | 4584 | 4584 | 4776 | 4775 | 4776 | 4968 | 4968 | 5160 | 5160 | 5352 |
| 6 | 5352 | 5352 | 5544 | 5736 | 5736 | 5992 | 5992 | 5992 | 6200 | 6200 |

For example, when an MCS level is 1, and an $I_{TBS}$ is 1, and if a calculated $N_{PRB}$ is 51, it may be determined that the first TBS is 1864.

Optionally, the network device determines the first TBS T according to a second formula $T=F(t\times a)$, and uniformly performs, according to the first TBS, modulation and coding on the first data carried in the first subframe and the first data carried in the second subframe. Herein, t is the TBS in the first subframe, the TBS in the first subframe is a TBS corresponding to the quantity of PRBs that are occupied by the first data carried in the first subframe, the function F is used for performing rounding up, rounding down, or rounding off, and a is a real number greater than 1. Herein, a is $(M_1+M_2)/M_2$, $M_1$ is used to indicate a quantity of PRBs or a quantity of OFDM symbols that are occupied by the first data carried in the second subframe and/or control information carried in the second subframe, and $M_2$ is used to indicate a quantity of PRBs or a quantity of OFDM symbols that are occupied by the first data carried in the first subframe and/or control information carried in the first subframe.

Optionally, the network device determines the second TBS P according to a fourth formula $P=F(p\times a)$. Herein, p is the TBS in the first subframe, the TBS in the first subframe is a TBS corresponding to the quantity of PRBs that are occupied by the first data carried in the first subframe, the function F is used for performing rounding up, rounding down, or rounding off, and a is a positive real number not greater than 1.

Herein, a is $M_1/M_2$, $M_1$ is used to indicate a quantity of PRBs or a quantity of OFDM symbols that are occupied by the first data carried in the second subframe and/or control information carried in the second subframe, and $M_2$ is used to indicate a quantity of PRBs or a quantity of OFDM symbols that are occupied by the first data carried in the first subframe and/or control information carried in the first subframe.

Certainly, with reference to the first implementation, after calculation is performed using the third formula or the fourth formula, the TBS in the first subframe and the TBS in the second subframe may further be determined in a manner of searching Table 1. The searching manner is the same as that described in the first implementation, and is not described herein again.

3. In a third implementation, for the foregoing two implementations, the network device may create a first table for the TBS in the first subframe and the TBS in the second subframe according to a, the network device creates a first table for the TBS in the first subframe and the first TBS according to a, the network device creates, according to a, a first table for the quantity of PRBs that are occupied by the first data carried in the first subframe and the quantity of PRBs that are occupied by the first data carried in the second subframe, or the network device creates, according to a, a first table for the quantity of PRBs that are occupied by the first data carried in the first subframe and the quantity of PRBs that are jointly occupied by the first data carried in the first subframe and the first data carried in the second subframe.

In this way, the network device may determine the first TBS or the second TBS according to the first table.

Optionally, the first table may include at least one of a layer-1 TBS table, a layer-2 TBS table, a layer-3 TBS table, or a layer-4 TBS table in an LTE system. Alternatively, a corresponding TBS used when the PRB quantity exceeds 110 is defined in a preset table. Alternatively, a corresponding TBS used when a TBS exceeds the range of a prior-art table is defined in a preset table. In this way, it ensures that even if a calculated TBS is outside a prior-art table, a corresponding first TBS may be found from a preset table.

Herein, a is $(M_1+M_2)/M_2$ or $M_1/M_2$, $M_1$ is used to indicate the quantity of PRBs or the quantity of OFDM symbols that are occupied by the first data carried in the second subframe and/or the control information carried in the second subframe, and $M_2$ is used to indicate the quantity of PRBs or the quantity of OFDM symbols that are occupied by the first data carried in the first subframe and/or the control information carried in the first subframe.

Optionally, the network device may further send a. Herein, a is $(M_1+M_2)/M_2$ or $M_1/M_2$, $M_1$ is used to indicate the quantity of PRBs or the quantity of OFDM symbols that are occupied by the first data carried in the second subframe and/or the control information carried in the second subframe, and $M_2$ is used to indicate the quantity of PRBs or the quantity of OFDM symbols that are occupied by the first data carried in the first subframe and/or the control information carried in the first subframe. Alternatively, $M_1$ and $M_2$ may be PRB quantities or quantities of sampling time intervals, provided that $M_1$ and $M_2$ herein can represent a quantity of physical resources that are occupied by information sent to the user equipment in the second subframe and a quantity of physical resources that are occupied by information sent to the user equipment in the first subframe. Certainly, the network device and the user equipment may predefine a rule for generating a scale factor. The network device and the user equipment generate scale factors all according to this rule, and a scale factor does not need to be sent by the network device.

Step 204: The network device sends the first subframe and the second subframe to user equipment.

The first subframe is sent after the second subframe. The first subframe includes M OFDM symbols, the second subframe includes N OFDM symbols, M and N are positive integers, and M≥N.

Optionally, DCI of the first subframe includes a modulation and coding parameter that is used to indicate the first data carried in the first subframe.

The modulation and coding parameter of the first data carried in the first subframe includes an MCS level of the first data carried in the first subframe, the quantity of PRBs that are occupied by the first data carried in the first subframe, and the locations of the PRBs that are occupied by the first data carried in the first subframe.

Further, optionally, the DCI of the first subframe further includes a modulation and coding parameter that is used to indicate the first data carried in the second subframe.

The modulation and coding parameter of the first data carried in the second subframe includes an MCS level of the first data carried in the second subframe, the quantity of PRBs that are occupied by the first data carried in the second subframe, and locations of the PRBs that are occupied by the first data carried in the second subframe.

Optionally, after sending the first subframe and the second subframe to the user equipment, the network device may receive first feedback information sent by the user equipment. The first feedback information is used to indicate whether the user equipment correctly receives the first subframe and the second subframe. In this way, one piece of feedback information can indicate receiving statuses of two subframes. Preferably, the first feedback information may be hybrid automatic repeat request (HARQ) information.

According to the data transmission method provided in this embodiment of the present disclosure, a network device obtains a quantity of PRBs that are occupied by first data carried in a first subframe, determines a first TBS or a second TBS according to the quantity of PRBs that are occupied by the first data carried in the first subframe, performs, according to the first TBS or the second TBS, modulation and coding on the first data carried in the first subframe and first data carried in a second subframe, and sends the first subframe and the second subframe to user equipment. This resolves a problem that modulation and coding, and data transmission cannot be performed on an incomplete subframe.

Figure 3:
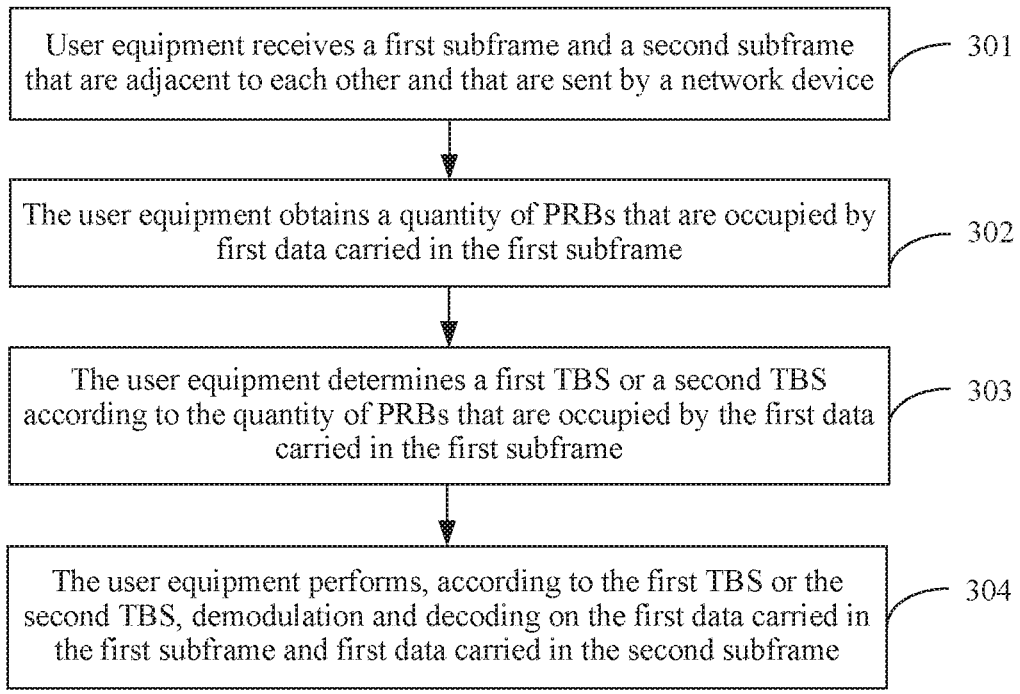
FIG. 3 is a schematic flowchart of a data transmission method according to another embodiment of the present disclosure.

With reference to the embodiment corresponding to FIG. 2, another embodiment of the present disclosure provides a data transmission method, that is, a corresponding receive side method of the embodiment corresponding to FIG. 2. As shown in FIG. 3, the method includes the following steps.

Step 301: User equipment receives a first subframe and a second subframe that are adjacent to each other and that are sent by a network device.

The first subframe is sent after the second subframe. The first subframe includes M OFDM symbols, the second subframe includes N OFDM symbols, M and N are positive integers, and M≥N.

Step 302: The user equipment obtains a quantity of PRBs that are occupied by first data carried in the first subframe.

The first data is data that is sent by the network device to the user equipment. Optionally, the user equipment may further obtain locations of the PRBs that are occupied by the first data carried in the first subframe. Preferably, the quantity of PRBs that are occupied by the first data carried in the first subframe and the locations of the PRBs that are occupied by the first data carried in the first subframe are preconfigured, or may be determined by the network device or the user equipment.

Step 303: The user equipment determines a first TBS or a second TBS according to the quantity of PRBs that are occupied by the first data carried in the first subframe.

The second TBS includes a TBS in the first subframe and a TBS in the second subframe.

Step 304: The user equipment performs, according to the first TBS or the second TBS, demodulation and decoding on the first data carried in the first subframe and first data carried in the second subframe.

The first subframe and the second subframe are adjacent subframes. Optionally, as shown in FIG. 1, the first subframe is a subframe on an unlicensed spectrum, and a previous subframe of the first subframe is the second subframe on the unlicensed spectrum. That is, the second subframe may be an incomplete subframe, and the first subframe is a complete subframe. It should be noted that the second subframe may be a null subframe.

With reference to step 303, that the user equipment determines the first TBS or the second TBS, and performs, according to the first TBS or the second TBS, demodulation and decoding on the first data carried in the first subframe and the first data carried in the second subframe may be implemented in three implementations corresponding to the three MCSs described in step 203. Certainly, the three implementations are only examples for illustration, and do not indicate that the present disclosure is limited thereto.

1. In a first implementation, the user equipment uniformly performs demodulation on the first data carried in the first subframe and the first data carried in the second subframe.

Optionally, the user equipment determines, according to a first formula $S=F(s \times a)$, a quantity S of PRBs that are jointly occupied by the first data carried in the first subframe and the first data carried in the second subframe. Herein, s is the quantity of PRBs that are occupied by the first data carried in the first subframe, the function F is used for performing rounding up, rounding down, or rounding off, and a is a real number greater than 1.

The user equipment determines the first TBS according to the quantity of PRBs that are jointly occupied by the first data carried in the first subframe and the first data carried in the second subframe, and uniformly performs, according to the first TBS, demodulation on the first data carried in the first subframe and the first data carried in the second subframe.

Optionally, the user equipment determines the first TBS T according to a second formula $T=F(t \times a)$, and uniformly performs, according to the first TBS, demodulation on the first data carried in the first subframe and the first data carried in the second subframe. Herein, t is the TBS in the first subframe, the TBS in the first subframe is a TBS corresponding to the quantity of PRBs that are occupied by the first data carried in the first subframe, the function F is used for performing rounding up, rounding down, or rounding off, and a is a real number greater than 1.

Herein, a is $(M_1+M_2)/M_2$, $M_1$ is used to indicate a quantity of PRBs or a quantity of OFDM symbols that are occupied by the first data carried in the second subframe and/or control information carried in the second subframe, and $M_2$ is used to indicate a quantity of PRBs or a quantity of OFDM symbols that are occupied by the first data carried in the first subframe and/or control information carried in the first subframe.

2. In a second implementation, the user equipment performs, according to the second TBS, demodulation and decoding separately on the first data carried in the first subframe and the first data carried in the second subframe. In this case, the user equipment performs, according to the TBS in the first subframe, demodulation and decoding on the first data carried in the first subframe, and performs, according to the TBS in the second subframe, demodulation and decoding on the first data carried in the second subframe. The TBS in the first subframe is a TBS corresponding to the quantity of PRBs that are occupied by the first data carried in the first subframe, and the TBS in the second subframe is a TBS corresponding to a quantity of PRBs that are occupied by the first data carried in the second subframe.

Optionally, the user equipment determines, according to a third formula $L=F(l \times a)$, the quantity L of PRBs that are occupied by the first data carried in the second subframe. Herein, l is the quantity of PRBs that are occupied by the first data carried in the first subframe, the function F is used for performing rounding up, rounding down, or rounding off, and a is a positive real number not greater than 1.

The user equipment determines the TBS in the second subframe according to the quantity of PRBs that are occupied by the first data carried in the second subframe.

The user equipment determines the TBS in the first subframe according to the quantity of PRBs that are occupied by the first data carried in the first subframe.

The user equipment performs, according to the TBS in the first subframe, demodulation and decoding on the first data carried in the first subframe, and performs, according to the TBS in the second subframe, demodulation and decoding on the first data carried in the second subframe.

Optionally, the user equipment determines the second TBS P according to a fourth formula $P=F(p \times a)$. Herein, p is the TBS in the first subframe, the TBS in the first subframe is a TBS corresponding to the quantity of PRBs that are occupied by the first data carried in the first subframe, the function F is used for performing rounding up, rounding down, or rounding off, and a is a positive real number not greater than 1.

The user equipment performs, according to the TBS in the first subframe, demodulation and decoding on the first data carried in the first subframe, and performs, according to the TBS in the second subframe, demodulation and decoding on the first data carried in the second subframe.

Herein, a is $M_1/M_2$, $M_1$ is used to indicate a quantity of PRBs or a quantity of OFDM symbols that are occupied by the first data carried in the second subframe and/or control information carried in the second subframe, and $M_2$ is used to indicate a quantity of PRBs or a quantity of OFDM symbols that are occupied by the first data carried in the first subframe and/or control information carried in the first subframe.

3. In a third implementation, for the foregoing two implementations, the user equipment may create a first table for the TBS in the first subframe and the TBS in the second subframe according to a, the user equipment creates a first table for the TBS in the first subframe and the first TBS according to a, the user equipment creates, according to a, a first table for the quantity of PRBs that are occupied by the first data carried in the first subframe and the quantity of PRBs that are occupied by the first data carried in the second subframe, or the user equipment creates, according to a, a first table for the quantity of PRBs that are occupied by the first data carried in the first subframe and the quantity of PRBs that are jointly occupied by the first data carried in the first subframe and the first data carried in the second subframe.

In this way, the user equipment may determine the first TBS or the second TBS according to the first table.

Optionally, the first table may include at least one of a layer-1 TBS table, a layer-2 TBS table, a layer-3 TBS table, or a layer-4 TBS table in an LTE system. Alternatively, a corresponding TBS used when the PRB quantity exceeds 110 is defined in a preset table. Alternatively, a corresponding TBS used when a TBS exceeds the range of a prior-art table is defined in a preset table. In this way, it ensures that even if a calculated TBS is outside a prior-art table, a corresponding first TBS may be found from a preset table.

Herein, a is $(M_1+M_2)/M_2$ or $M_1/M_2$, $M_1$ is used to indicate the quantity of PRBs or the quantity of OFDM symbols that are occupied by the first data carried in the second subframe and/or the control information carried in the second subframe, and $M_2$ is used to indicate the quantity of PRBs or the quantity of OFDM symbols that are occupied by the first data carried in the first subframe and/or the control information carried in the first subframe.

Optionally, the user equipment may receive a sent by the network device. Herein, a is $(M_1+M_2)/M_2$ or $M_1/M_2$, $M_1$ is used to indicate the quantity of PRBs or the quantity of OFDM symbols that are occupied by the first data carried in the second subframe and/or the control information carried in the second subframe, and $M_2$ is used to indicate the quantity of PRBs or the quantity of OFDM symbols that are occupied by the first data carried in the first subframe and/or the control information carried in the first subframe. Alternatively, $M_1$ and $M_2$ may be PRB quantities or quantities of sampling time intervals, provided that $M_1$ and $M_2$ herein can represent a quantity of physical resources that are occupied by information sent to the user equipment in the second subframe and a quantity of physical resources that are occupied by information sent to the user equipment in the first subframe. Certainly, the network device and the user equipment may predefine a rule for generating a scale factor. The network device and the user equipment generate scale factors all according to this rule, and a scale factor does not need to be sent by the network device.

Optionally, DCI of the first subframe includes a modulation and coding parameter that is used to indicate the first data carried in the first subframe.

The modulation and coding parameter of the first data carried in the first subframe includes an MCS level of the first data carried in the first subframe, the quantity of PRBs that are occupied by the first data carried in the first subframe, and the locations of the PRBs that are occupied by the first data carried in the first subframe.

Optionally, the DCI of the first subframe further includes a modulation and coding parameter that is used to indicate the first data carried in the second subframe.

The modulation and coding parameter of the first data carried in the second subframe includes an MCS level of the first data carried in the second subframe, the quantity of PRBs that are occupied by the first data carried in the second subframe, and locations of the PRBs that are occupied by the first data carried in the second subframe.

Optionally, after receiving the first subframe and the second subframe sent by the network device, the user equipment may send first feedback information to the network device. The first feedback information is used to indicate whether the user equipment correctly receives the first subframe and the second subframe. In this way, one piece of feedback information can indicate receiving statuses of two subframes. Preferably, the first feedback information may be HARQ information.

According to the data transmission method provided in this embodiment of the present disclosure, user equipment receives a first subframe and a second subframe that are adjacent to each other and that are sent by a network device, obtains a quantity of PRBs that are occupied by first data carried in the first subframe, determines a first TBS or a second TBS according to the quantity of PRBs that are occupied by the first data carried in the first subframe, and performs, according to the first TBS or the second TBS, demodulation and decoding on the first data carried in the first subframe and first data carried in the second subframe. This resolves a problem that modulation and coding, and data transmission cannot be performed on an incomplete subframe.

Figure 4:
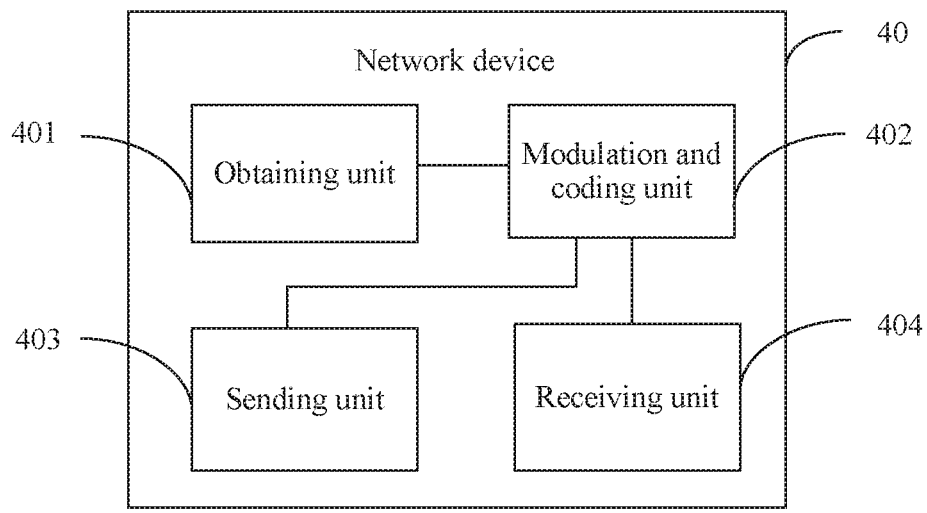
FIG. 4 is a schematic structural diagram of a network device according to an embodiment of the present disclosure.

On the basis of the embodiment corresponding to FIG. 2, an embodiment of the present disclosure shown in FIG. 4 provides a network device 40 in order to perform the data transmission method described in the embodiment corresponding to FIG. 2. As shown in FIG. 4, the network device 40 includes an obtaining unit 401, a modulation and coding unit 402, and a sending unit 403.

The obtaining unit 401 is configured to obtain a quantity of PRBs that are occupied by first data carried in a first subframe. The first data is data that is sent by the network device 40 to user equipment.

The modulation and coding unit 402 is configured to determine a first TBS or a second TBS according to the quantity that is obtained by the obtaining unit 401 and that is of PRBs that are occupied by the first data carried in the first subframe, where the second TBS includes a TBS in the first subframe and a TBS in a second subframe, and perform, according to the first TBS or the second TBS, modulation and coding on the first data carried in the first subframe and first data carried in the second subframe, where the first subframe and the second subframe are adjacent subframes.

The sending unit 403 is configured to send the first subframe and the second subframe to the user equipment. The first subframe is sent after the second subframe. The first subframe includes M OFDM symbols, the second subframe includes N OFDM symbols, M and N are positive integers, and M≥N.

Optionally, the first subframe and the second subframe are adjacent subframes. Optionally, the first subframe is a subframe on an unlicensed spectrum, and a previous subframe of the first subframe is the second subframe on the unlicensed spectrum. That is, the second subframe may be an incomplete subframe, and the first subframe is a complete subframe. It should be noted that the second subframe may be a null subframe.

Optionally, in a first application scenario, the modulation and coding unit 402 is further configured to determine, according to a first formula S=F(s×a), a quantity S of PRBs that are jointly occupied by the first data carried in the first subframe and the first data carried in the second subframe, where s is the quantity of PRBs that are occupied by the first data carried in the first subframe, the function F is used for performing rounding up, rounding down, or rounding off, and a is a real number greater than 1, and determine the first TBS according to the quantity of PRBs that are jointly occupied by the first data carried in the first subframe and the first data carried in the second subframe.

Optionally, the modulation and coding unit 402 is further configured to determine the first TBS T according to a second formula T=F(t×a). Herein, t is the TBS in the first subframe, the TBS in the first subframe is a TBS corresponding to the quantity of PRBs that are occupied by the first data carried in the first subframe, the function F is used for performing rounding up, rounding down, or rounding off, and a is a real number greater than 1.

Herein, a is $(M_1+M_2)/M_2$, $M_1$ is used to indicate a quantity of PRBs or a quantity of OFDM symbols that are occupied by the first data carried in the second subframe and/or control information carried in the second subframe, and $M_2$ is used to indicate a quantity of PRBs or a quantity of OFDM symbols that are occupied by the first data carried in the first subframe and/or control information carried in the first subframe.

Optionally, in a second application scenario, the modulation and coding unit 402 is further configured to determine, according to a third formula L=F(l×a), a quantity L of PRBs that are occupied by the first data carried in the second subframe, where l is the quantity of PRBs that are occupied by the first data carried in the first subframe, the function F is used for performing rounding up, rounding down, or rounding off, and a is a positive real number not greater than 1, determine the TBS in the second subframe according to the quantity of PRBs that are occupied by the first data carried in the second subframe, and determine the TBS in the first subframe according to the quantity of PRBs that are occupied by the first data carried in the first subframe.

Optionally, the modulation and coding unit 402 is further configured to determine the second TBS P according to a fourth formula P=F(p×a). Herein, p is the TBS in the first subframe, the TBS in the first subframe is a TBS corresponding to the quantity of PRBs that are occupied by the first data carried in the first subframe, the function F is used for performing rounding up, rounding down, or rounding off, and a is a positive real number not greater than 1.

Herein, a is $M_1/M_2$, $M_1$ is used to indicate a quantity of PRBs or a quantity of OFDM symbols that are occupied by the first data carried in the second subframe and/or control information carried in the second subframe, and $M_2$ is used to indicate a quantity of PRBs or a quantity of OFDM symbols that are occupied by the first data carried in the first subframe and/or control information carried in the first subframe.

Optionally, the sending unit 403 is further configured to send a to the user equipment.

Optionally, the modulation and coding unit 402 is further configured to create a first table for the TBS in the first subframe and the TBS in the second subframe according to a, create a first table for the TBS in the first subframe and the first TBS according to a, create, according to a, a first table for the quantity of PRBs that are occupied by the first data carried in the first subframe and the quantity of PRBs that are occupied by the first data carried in the second subframe, or create, according to a, a first table for the quantity of PRBs that are occupied by the first data carried in the first subframe and the quantity of PRBs that are jointly occupied by the first data carried in the first subframe and the first data carried in the second subframe, and determine the first TBS or the second TBS according to the first table.

Optionally, DCI of the first subframe includes a modulation and coding parameter that is used to indicate the first data carried in the first subframe.

The modulation and coding parameter of the first data carried in the first subframe includes an MCS level of the first data carried in the first subframe, the quantity of PRBs that are occupied by the first data carried in the first subframe, and locations of the PRBs that are occupied by the first data carried in the first subframe.

Optionally, the DCI of the first subframe further includes a modulation and coding parameter that is used to indicate the first data carried in the second subframe.

The modulation and coding parameter of the first data carried in the second subframe includes an MCS level of the first data carried in the second subframe, the quantity of PRBs that are occupied by the first data carried in the second subframe, and locations of the PRBs that are occupied by the first data carried in the second subframe.

Optionally, the network device 40 further includes a receiving unit 404 configured to receive first feedback information sent by the user equipment. The first feedback information is used to indicate whether the user equipment correctly receives the first subframe and the second subframe.

The network device 40 provided in this embodiment of the present disclosure obtains a quantity of PRBs that are occupied by first data carried in a first subframe, determines a first TBS or a second TBS according to the quantity of PRBs that are occupied by the first data carried in the first subframe, performs, according to the first TBS or the second TBS, modulation and coding on the first data carried in the first subframe and first data carried in a second subframe, and sends the first subframe and the second subframe to user equipment. This resolves a problem that modulation and coding, and data transmission cannot be performed on an incomplete subframe.

Figure 5:
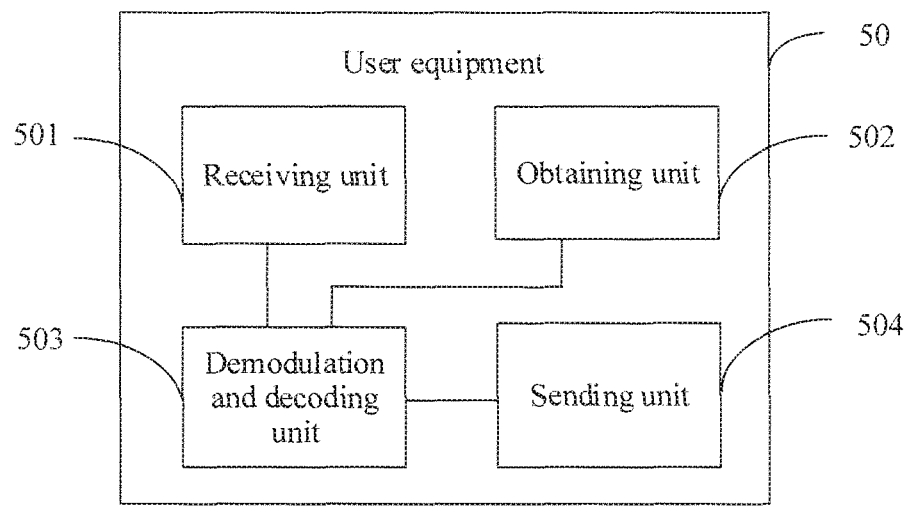
FIG. 5 is a schematic structural diagram of user equipment according to an embodiment of the present disclosure.

On the basis of the embodiment corresponding to FIG. 3, an embodiment of the present disclosure provides user equipment in order to perform the data transmission method described in the embodiment corresponding to FIG. 3. As shown in FIG. 5, a user equipment 50 includes a receiving unit 501, an obtaining unit 502, and a demodulation and decoding unit 503.

The receiving unit 501 is configured to receive a first subframe and a second subframe that are adjacent to each other and that are sent by a network device. The first subframe is sent after the second subframe. The first subframe includes M OFDM symbols, the second subframe includes N OFDM symbols, M and N are positive integers, and M≥N.

The obtaining unit 502 is configured to obtain a quantity of PRBs that are occupied by first data carried in the first subframe. The first data is data that is sent by the network device to the user equipment 50.

The demodulation and decoding unit 503 is configured to determine a first TBS or a second TBS according to the quantity that is obtained by the obtaining unit 502 and that is of PRBs that are occupied by the first data carried in the first subframe, where the second TBS includes a TBS in the first subframe and a TBS in the second subframe, and perform, according to the first TBS or the second TBS, demodulation and decoding on the first data carried in the first subframe and first data carried in the second subframe.

Optionally, the first subframe and the second subframe are adjacent subframes. Optionally, the first subframe is a subframe on an unlicensed spectrum, and a previous subframe of the first subframe is the second subframe on the unlicensed spectrum. That is, the second subframe may be an incomplete subframe, and the first subframe is a complete subframe. It should be noted that the second subframe may be a null subframe.

Optionally, in a first application scenario, the demodulation and decoding unit 503 is further configured to determine, according to a first formula S=F(s×a), a quantity S of PRBs that are jointly occupied by the first data carried in the first subframe and the first data carried in the second subframe, where s is the quantity of PRBs that are occupied by the first data carried in the first subframe, the function F is used for performing rounding up, rounding down, or rounding off, and a is a real number greater than 1, and determine the first TBS according to the quantity of PRBs that are jointly occupied by the first data carried in the first subframe and the first data carried in the second subframe.

Optionally, the demodulation and decoding unit 503 is further configured to determine the first TBS T according to a second formula T=F(t×a). Herein, t is the TBS in the first subframe, the TBS in the first subframe is a TBS corresponding to the quantity of PRBs that are occupied by the first data carried in the first subframe, the function F is used for performing rounding up, rounding down, or rounding off, and a is a real number greater than 1.

Herein, a is $(M_1+M_2)/M_2$, $M_1$ is used to indicate a quantity of PRBs or a quantity of OFDM symbols that are occupied by the first data carried in the second subframe and/or control information carried in the second subframe, and $M_2$ is used to indicate a quantity of PRBs or a quantity of OFDM symbols that are occupied by the first data carried in the first subframe and/or control information carried in the first subframe.

Optionally, in a second application scenario, the demodulation and decoding unit 503 is further configured to determine, according to a third formula L=F(l×a), a quantity L of PRBs that are occupied by the first data carried in the second subframe, where l is the quantity of PRBs that are occupied by the first data carried in the first subframe, the function F is used for performing rounding up, rounding down, or rounding off, and a is a positive real number not greater than 1, determine the TBS in the second subframe according to the quantity of PRBs that are occupied by the first data carried in the second subframe, and determine the TBS in the first subframe according to the quantity of PRBs that are occupied by the first data carried in the first subframe.

Optionally, the demodulation and decoding unit 503 is further configured to determine the second TBS P according to a fourth formula P=F(p×a). Herein, p is the TBS in the first subframe, the TBS in the first subframe is a TBS corresponding to the quantity of PRBs that are occupied by the first data carried in the first subframe, the function F is used for performing rounding up, rounding down, or rounding off, and a is a positive real number not greater than 1.

Herein, a is $M_1/M_2$, $M_1$ is used to indicate a quantity of PRBs or a quantity of OFDM symbols that are occupied by the first data carried in the second subframe and/or control information carried in the second subframe, and $M_2$ is used to indicate a quantity of PRBs or a quantity of OFDM symbols that are occupied by the first data carried in the first subframe and/or control information carried in the first subframe.

Optionally, the receiving unit 501 is further configured to receive a sent by the network device.

Optionally, the demodulation and decoding unit 503 is further configured to create a first table for the TBS in the first subframe and the TBS in the second subframe according to a, create a first table for the TBS in the first subframe and the first TBS according to a, create, according to a, a first table for the quantity of PRBs that are occupied by the first data carried in the first subframe and the quantity of PRBs that are occupied by the first data carried in the second subframe, or create, according to a, a first table for the quantity of PRBs that are occupied by the first data carried in the first subframe and the quantity of PRBs that are jointly occupied by the first data carried in the first subframe and the first data carried in the second subframe, and determine the first TBS or the second TBS according to the first table.

Optionally, DCI of the first subframe includes a modulation and coding parameter that is used to indicate the first data carried in the first subframe.

The modulation and coding parameter of the first data carried in the first subframe includes an MCS level of the first data carried in the first subframe, the quantity of PRBs that are occupied by the first data carried in the first subframe, and locations of the PRBs that are occupied by the first data carried in the first subframe.

Optionally, the DCI of the first subframe further includes a modulation and coding parameter that is used to indicate the first data carried in the second subframe.

The modulation and coding parameter of the first data carried in the second subframe includes an MCS level of the first data carried in the second subframe, the quantity of PRBs that are occupied by the first data carried in the second subframe, and locations of the PRBs that are occupied by the first data carried in the second subframe.

Optionally, the user equipment 50 further includes a sending unit 504 configured to send first feedback information to the network device. The first feedback information is used to indicate whether the user equipment 50 correctly receives the first subframe and the second subframe.

According to the user equipment 50 provided in this embodiment of the present disclosure, the user equipment 50 receives a first subframe and a second subframe that are adjacent to each other and that are sent by a network device, obtains a quantity of PRBs that are occupied by first data carried in the first subframe, determines a first TBS or a second TBS according to the quantity of PRBs that are occupied by the first data carried in the first subframe, and performs, according to the first TBS or the second TBS, demodulation and decoding on the first data carried in the first subframe and first data carried in the second subframe. This resolves a problem that modulation and coding, and data transmission cannot be performed on an incomplete subframe.

Figure 6:
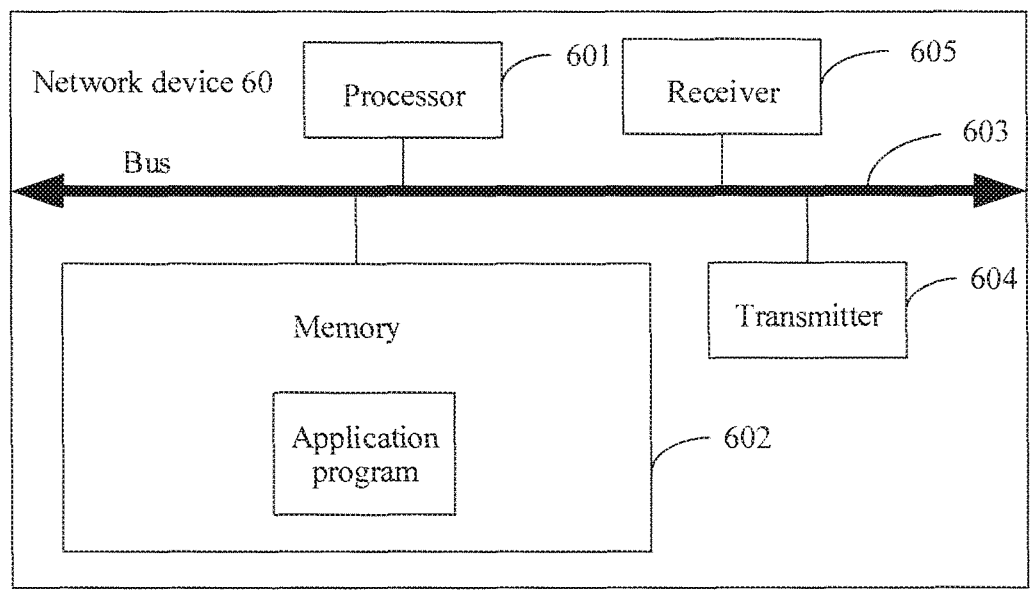
FIG. 6 is a schematic structural diagram of a network device according to another embodiment of the present disclosure.

On the basis of the embodiment corresponding to FIG. 2, another embodiment of the present disclosure provides a network device 60 in FIG. 6 in order to perform the data transmission method described in the embodiment corresponding to FIG. 2. As shown in FIG. 6, the network device 60 includes at least one processor 601, a memory 602, a bus 603, and a transmitter 604. The at least one processor 601, the memory 602, and the transmitter 604 are connected using the bus 603, and implement communication with each other using the bus 603.

The bus 603 may be an industry standard architecture (ISA) bus, a Peripheral Component Interconnect (PCI) bus, an extended ISA (EISA) bus, or the like. The bus 603 may be classified into an address bus, a data bus, a control bus, and the like. For ease of representation, only one thick line is used in FIG. 6 to represent the bus 603. However, it does not indicate that there is only one bus or only one type of bus.

The memory 602 is configured to execute application program of the solutions of the present disclosure. The application program for executing the solutions of the present disclosure is stored in the memory 602, and is executed by means of controlling by the processor 601.

The memory may be a read-only memory (ROM), or another type of static storage device that can store static information and a static instruction, or a random access memory (RAM), or another type of dynamic storage device that can store information and an instruction, or may be an electrically erasable programmable ROM (EEPROM), a compact disc ROM (CD-ROM) or other optical disk storage or optical disc storage (including a compact disc, a laser disc, an optical disc, a digital versatile disc, a BLU-RAY DISC, and the like), a disk storage medium or another magnetic storage device, or any other medium that can be used to carry or store expected program code in a form of an instruction or a data structure and can be accessed by a computer. However, this is not limited herein. These memories are connected to the processor using the bus.

The processor 601 may be a central processing unit (CPU), or an application-specific integrated circuit (ASIC), or one or more integrated circuits configured to implement this embodiment of the present disclosure.

The processor 601 is configured to invoke the application program stored in the memory 602. In a possible implementation, when the application program is executed by the processor 601, the following functions are implemented.

The processor 601 is configured to obtain a quantity of PRBs that are occupied by first data carried in a first subframe, where the first data is data that is sent by the network device to user equipment, and determine a first TBS or a second TBS according to the quantity of PRBs that are occupied by the first data carried in the first subframe, where the second TBS includes a TBS in the first subframe and a TBS in a second subframe, and perform, according to the first TBS or the second TBS, modulation and coding on the first data carried in the first subframe and first data carried in the second subframe, where the first subframe and the second subframe are adjacent subframes.

The transmitter 604 is configured to send the first subframe and the second subframe to the user equipment. The first subframe is sent after the second subframe. The first subframe includes M OFDM symbols, the second subframe includes N OFDM symbols, M and N are positive integers, and M≥N.

Optionally, the first subframe and the second subframe are adjacent subframes. Optionally, the first subframe is a subframe on an unlicensed spectrum, and a previous subframe of the first subframe is the second subframe on the unlicensed spectrum. That is, the second subframe may be an incomplete subframe, and the first subframe is a complete subframe. It should be noted that the second subframe may be a null subframe.

Optionally, in a first application scenario, the processor 601 is further configured to determine, according to a first formula S=F(s×a), a quantity S of PRBs that are jointly occupied by the first data carried in the first subframe and the first data carried in the second subframe, where s is the quantity of PRBs that are occupied by the first data carried in the first subframe, the function F is used for performing rounding up, rounding down, or rounding off, and a is a real number greater than 1, and determine the first TBS according to the quantity of PRBs that are jointly occupied by the first data carried in the first subframe and the first data carried in the second subframe.

Optionally, the processor 601 is further configured to determine the first TBS T according to a second formula T=F(t×a). Herein, t is the TBS in the first subframe, the TBS in the first subframe is a TBS corresponding to the quantity of PRBs that are occupied by the first data carried in the first subframe, the function F is used for performing rounding up, rounding down, or rounding off, and a is a real number greater than 1.

Herein, a is $(M_1+M_2)/M_2$, $M_1$ is used to indicate a quantity of PRBs or a quantity of OFDM symbols that are occupied by the first data carried in the second subframe and/or control information carried in the second subframe, and $M_2$ is used to indicate a quantity of PRBs or a quantity of OFDM symbols that are occupied by the first data carried in the first subframe and/or control information carried in the first subframe.

Optionally, in a second application scenario, the processor 601 is further configured to determine, according to a third formula L=F(l×a), a quantity L of PRBs that are occupied by the first data carried in the second subframe, where l is the quantity of PRBs that are occupied by the first data carried in the first subframe, the function F is used for performing rounding up, rounding down, or rounding off, and a is a positive real number not greater than 1, determine the TBS in the second subframe according to the quantity of PRBs that are occupied by the first data carried in the second subframe, and determine the TBS in the first subframe according to the quantity of PRBs that are occupied by the first data carried in the first subframe.

Optionally, the processor 601 is further configured to determine the second TBS P according to a fourth formula P=F(p×a). Herein, p is the TBS in the first subframe, the TBS in the first subframe is a TBS corresponding to the quantity of PRBs that are occupied by the first data carried in the first subframe, the function F is used for performing rounding up, rounding down, or rounding off, and a is a positive real number not greater than 1.

Herein, a is $M_1/M_2$, $M_1$ is used to indicate a quantity of PRBs or a quantity of OFDM symbols that are occupied by the first data carried in the second subframe and/or control information carried in the second subframe, and $M_2$ is used to indicate a quantity of PRBs or a quantity of OFDM symbols that are occupied by the first data carried in the first subframe and/or control information carried in the first subframe.

Optionally, the processor 601 is further configured to create a first table for the TBS in the first subframe and the TBS in the second subframe according to a, create a first table for the TBS in the first subframe and the first TBS according to a, or create, according to a, a first table for the quantity of PRBs that are occupied by the first data carried in the first subframe and the quantity of PRBs that are occupied by the first data carried in the second subframe, or create, according to a, a first table for the quantity of PRBs that are occupied by the first data carried in the first subframe and the quantity of PRBs that are jointly occupied by the first data carried in the first subframe and the first data carried in the second subframe, and determine the first TBS or the second TBS according to the first table.

Optionally, DCI of the first subframe includes a modulation and coding parameter that is used to indicate the first data carried in the first subframe.

The modulation and coding parameter of the first data carried in the first subframe includes an MCS level of the first data carried in the first subframe, the quantity of PRBs that are occupied by the first data carried in the first subframe, and locations of the PRBs that are occupied by the first data carried in the first subframe.

Further, optionally, the DCI of the first subframe further includes a modulation and coding parameter that is used to indicate the first data carried in the second subframe.

The modulation and coding parameter of the first data carried in the second subframe includes an MCS level of the first data carried in the second subframe, the quantity of PRBs that are occupied by the first data carried in the second subframe, and locations of the PRBs that are occupied by the first data carried in the second subframe.

Optionally, the network device 60 further includes a receiver 605 configured to receive first feedback information sent by the user equipment. The first feedback information is used to indicate whether the user equipment correctly receives the first subframe and the second subframe.

The network device 60 provided in this embodiment of the present disclosure obtains a quantity of PRBs that are occupied by first data carried in a first subframe, determines a first TBS or a second TBS according to the quantity of PRBs that are occupied by the first data carried in the first subframe, performs, according to the first TBS or the second TBS, modulation and coding on the first data carried in the first subframe and first data carried in a second subframe, and sends the first subframe and the second subframe to user equipment. This resolves a problem that modulation and coding, and data transmission cannot be performed on an incomplete subframe.

Figure 7:
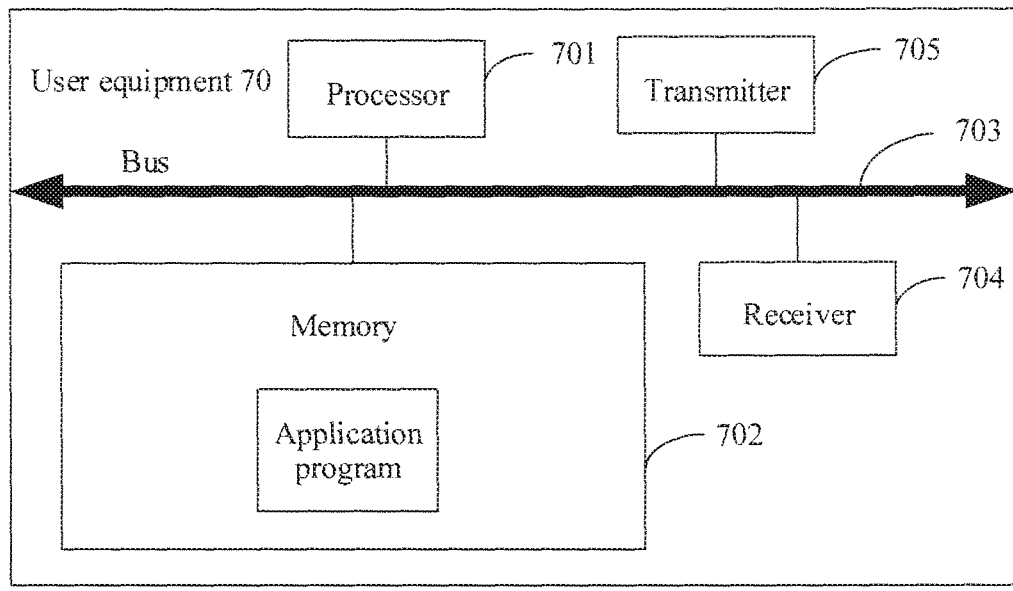
FIG. 7 is a schematic structural diagram of user equipment according to another embodiment of the present disclosure.

On the basis of the embodiment corresponding to FIG. 3, another embodiment of the present disclosure provides user equipment 70 in FIG. 7 in order to perform the data transmission method described in the embodiment corresponding to FIG. 3. As shown in FIG. 7, the user equipment 70 includes at least one processor 701, a memory 702, a bus 703, and a receiver 704. The at least one processor 701, the memory 702, and the receiver 704 are connected using the bus 703, and implement communication with each other using the bus 703.

The bus 703 may be an ISA bus, a PCI bus, an EISA bus, or the like. The bus 703 may be classified into an address bus, a data bus, a control bus, and the like. For ease of representation, only one thick line is used in FIG. 7 to represent the bus 703. However, it does not indicate that there is only one bus or only one type of bus.

The memory 702 is configured to execute application program of the solutions of the present disclosure. The application program for executing the solutions of the present disclosure is stored in the memory 702, and is executed by means of controlling by the processor 701.

The memory may be a ROM, or another type of static storage device that can store static information and a static instruction, or a RAM, or another type of dynamic storage device that can store information and an instruction, or may be an EEPROM, a CD-ROM or other optical disk storage or optical disc storage (including a compact disc, a laser disc, an optical disc, a digital versatile disc, a BLU-RAY DISC, and the like), a disk storage medium or another magnetic storage device, or any other medium that can be used to carry or store expected program code in a form of an instruction or a data structure and can be accessed by a computer. However, this is not limited herein. These memories are connected to the processor 701 using the bus 703.

The processor 701 may be a CPU, or an ASIC, or one or more integrated circuits configured to implement this embodiment of the present disclosure.

The processor 701 is configured to invoke the application program stored in the memory 702. In a possible implementation, when the application program is executed by the processor 701, the following functions are implemented.

The receiver 704 is configured to receive a first subframe and a second subframe that are adjacent to each other and that are sent by a network device, where the first subframe is sent after the second subframe, the first subframe includes M OFDM symbols, the second subframe includes N OFDM symbols, M and N are positive integers, and M≥N.

The processor 701 is configured to obtain a quantity of PRBs that are occupied by first data carried in the first subframe, where the first data is data that is sent by the network device to the user equipment 70, determine a first TBS or a second TBS according to the quantity of PRBs that are occupied by the first data carried in the first subframe, where the second TBS includes a TBS in the first subframe and a TBS in the second subframe, and perform, according to the first TBS or the second TBS, demodulation and decoding on the first data carried in the first subframe and first data carried in the second subframe.

Optionally, the first subframe and the second subframe are adjacent subframes. Optionally, the first subframe is a subframe on an unlicensed spectrum, and a previous subframe of the first subframe is the second subframe on the unlicensed spectrum. That is, the second subframe may be an incomplete subframe, and the first subframe is a complete subframe. It should be noted that the second subframe may be a null subframe.

Optionally, in a first application scenario, the processor 701 is further configured to determine, according to a first formula $S=F(s \times a)$, a quantity S of PRBs that are jointly occupied by the first data carried in the first subframe and the first data carried in the second subframe, where s is the quantity of PRBs that are occupied by the first data carried in the first subframe, the function F is used for performing rounding up, rounding down, or rounding off, and a is a real number greater than 1, and determine the first TBS according to the quantity of PRBs that are jointly occupied by the first data carried in the first subframe and the first data carried in the second subframe.

Optionally, the processor 701 is further configured to determine the first TBS T according to a second formula $T=F(t \times a)$. Herein, t is the TBS in the first subframe, the TBS in the first subframe is a TBS corresponding to the quantity of PRBs that are occupied by the first data carried in the first subframe, the function F is used for performing rounding up, rounding down, or rounding off, and a is a real number greater than 1.

Herein, a is $(M_1+M_2)/M_2$, $M_1$ is used to indicate a quantity of PRBs or a quantity of OFDM symbols that are occupied by the first data carried in the second subframe and/or control information carried in the second subframe, and $M_2$ is used to indicate a quantity of PRBs or a quantity of OFDM symbols that are occupied by the first data carried in the first subframe and/or control information carried in the first subframe.

Optionally, in a second application scenario, the processor 701 is further configured to determine, according to a third formula $L=F(l \times a)$, a quantity L of PRBs that are occupied by the first data carried in the second subframe, where l is the quantity of PRBs that are occupied by the first data carried in the first subframe, the function F is used for performing rounding up, rounding down, or rounding off, and a is a positive real number not greater than 1, determine the TBS in the second subframe according to the quantity of PRBs that are occupied by the first data carried in the second subframe, and determine the TBS in the first subframe according to the quantity of PRBs that are occupied by the first data carried in the first subframe.

Optionally, the processor 701 is further configured to determine the second TBS P according to a fourth formula $P=F(p \times a)$. Herein, p is the TBS in the first subframe, the TBS in the first subframe is a TBS corresponding to the quantity of PRBs that are occupied by the first data carried in the first subframe, the function F is used for performing rounding up, rounding down, or rounding off, and a is a positive real number not greater than 1.

Herein, a is $M_1/M_2$, $M_1$ is used to indicate a quantity of PRBs or a quantity of OFDM symbols that are occupied by the first data carried in the second subframe and/or control information carried in the second subframe, and $M_2$ is used to indicate a quantity of PRBs or a quantity of OFDM symbols that are occupied by the first data carried in the first subframe and/or control information carried in the first subframe.

Optionally, the receiver 704 is further configured to receive a sent by the network device.

The processor 701 is further configured to create a first table for the TBS in the first subframe and the TBS in the second subframe according to a, create a first table for the TBS in the first subframe and the first TBS according to a, create, according to a, a first table for the quantity of PRBs that are occupied by the first data carried in the first subframe and the quantity of PRBs that are occupied by the first data carried in the second subframe, or create, according to a, a first table for the quantity of PRBs that are occupied by the first data carried in the first subframe and the quantity of PRBs that are jointly occupied by the first data carried in the first subframe and the first data carried in the second subframe, and determine the first TBS or the second TBS according to the first table.

Optionally, DCI of the first subframe includes a modulation and coding parameter that is used to indicate the first data carried in the first subframe.

The modulation and coding parameter of the first data carried in the first subframe includes an MCS level of the first data carried in the first subframe, the quantity of PRBs that are occupied by the first data carried in the first subframe, and locations of the PRBs that are occupied by the first data carried in the first subframe.

Further, optionally, the DCI of the first subframe further includes a modulation and coding parameter that is used to indicate the first data carried in the second subframe.

The modulation and coding parameter of the first data carried in the second subframe includes an MCS level of the first data carried in the second subframe, the quantity of PRBs that are occupied by the first data carried in the second subframe, and locations of the PRBs that are occupied by the first data carried in the second subframe.

Optionally, the user equipment 70 further includes a transmitter 705 configured to send first feedback information to the network device. The first feedback information is used to indicate whether the user equipment 70 correctly receives the first subframe and the second subframe.

According to the user equipment 70 provided in this embodiment of the present disclosure, the user equipment 70 receives a first subframe and a second subframe that are adjacent to each other and that are sent by a network device, obtains a quantity of PRBs that are occupied by first data carried in the first subframe, determines a first TBS or a second TBS according to the quantity of PRBs that are occupied by the first data carried in the first subframe, and performs, according to the first TBS or the second TBS, demodulation and decoding on the first data carried in the first subframe and first data carried in the second subframe. This resolves a problem that modulation and coding, and data transmission cannot be performed on an incomplete subframe.

Figure 8:
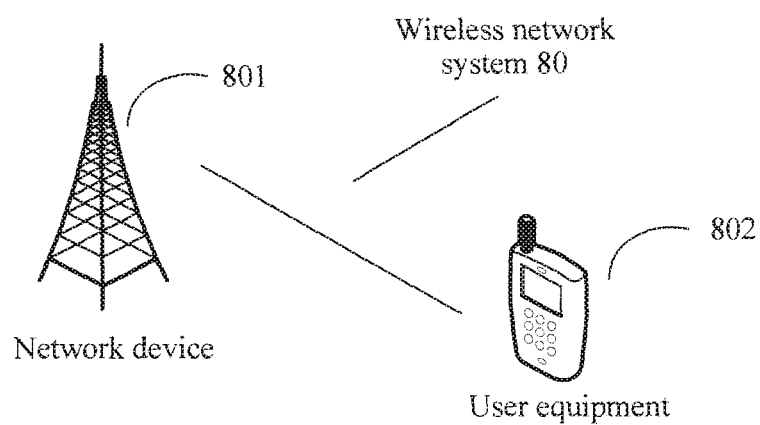
FIG. 8 is a schematic structural diagram of a wireless network system according to an embodiment of the present disclosure.

On the basis of the embodiments corresponding to FIG. 4 to FIG. 7, an embodiment of the present disclosure provides a wireless network system 80 in FIG. 8 in order to perform the data transmission method described in the embodiment corresponding to FIG. 2 and the data transmission method described in the embodiment corresponding to FIG. 3. As shown in FIG. 8, the wireless network system 80 includes a network device 801 and user equipment 802.

The network device 801 is the network device 40 described in the embodiment corresponding to FIG. 4, and the user equipment 802 is the user equipment 50 described in the embodiment corresponding to FIG. 5.

Alternatively, the network device 801 is the network device 60 described in the embodiment corresponding to FIG. 6, and the user equipment 802 is the user equipment 70 described in the embodiment corresponding to FIG. 7.

According to the wireless network system 80 provided in this embodiment of the present disclosure, the network device 801 obtains a quantity of PRBs that are occupied by first data carried in a first subframe, determines a first TBS or a second TBS according to the quantity of PRBs that are occupied by the first data carried in the first subframe, performs, according to the first TBS or the second TBS, modulation and coding on the first data carried in the first subframe and first data carried in a second subframe, and sends the first subframe and the second subframe to the user equipment 802. This resolves a problem that modulation and coding, and data transmission cannot be performed on an incomplete subframe.

In addition, a computer readable medium is further provided, including a computer readable instruction that is used to perform the following operation when the instruction is executed: executing the operations from steps 201 to 204 or steps 301 to 304 in the methods of the foregoing embodiments.

In addition, a computer program product is further provided, including the foregoing computer readable medium.

It should be noted that the signaling mentioned herein includes but is not limited to an indication, information, a signal, and a message, and is not limited herein.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present disclosure.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is only an example. For example, the unit division is only logical function division and may be other division in actual implementation. For example, multiple units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

With descriptions of the foregoing embodiments, persons skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a computer. The following is taken as an example instead of a limitation. The computer readable medium may include a RAM, a ROM, an EEPROM, a CD-ROM or other optical disc storage, a disk storage medium or another magnetic storage device, or any other medium that can be used to carry or store expected program code in a form of an instruction or a data structure and can be accessed by a computer. In addition, any connection may be appropriately defined as a computer-readable medium. For example, if software is transmitted from a website, a server or another remote source using a coaxial cable, an optical fiber cable, a twisted pair, a digital subscriber line (DSL) or wireless technologies such as infrared ray, radio, and microwave, the coaxial cable, the optical fiber cable, the twisted pair, the DSL, or the wireless technologies such as infrared ray, radio, and microwave are included in fixation of the medium. A disk and a disc used in the present disclosure includes a compact disc (CD), a laser disc, an optical disc, a digital versatile disc (DVD), a floppy disk, and a BLU-RAY DISC, where the disk generally copies data by a magnetic means, and the disc copies data optically by a laser means. The foregoing combination should also be included in the protection scope of the computer-readable medium.

The foregoing descriptions are only specific implementations of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A method, comprising:
    obtaining, by a network device, a quantity of physical resource blocks (PRBs) occupied by data carried in a first subframe, wherein the data carried in the first subframe is from the network device to user equipment;
    determining, by the network device, a first transport block size (TBS) or a second TBS according to the quantity of PRBs occupied by the data carried in the first subframe, wherein the second TBS comprises a TBS in the first subframe and a TBS in a second subframe, wherein determining the first TBS comprises:
        determining, by the network device according to a first formula $S=F(s \times a)$, a quantity of PRBs jointly occupied by the data carried in the first subframe and the data carried in the second subframe (S), wherein s is the quantity of PRBs occupied by the data carried in the first subframe, wherein the function F is used for performing rounding up, rounding down, or rounding off, wherein a is a real number greater than one and corresponds to $(M_1+M_2)/M_2$, wherein $M_1$ indicates a quantity of PRBs or a quantity of OFDM symbols occupied by the data carried in the second subframe or control information carried in the second subframe, and wherein $M_2$ indicates a quantity of PRBs or a quantity of OFDM symbols occupied by the data carried in the first subframe or control information carried in the first subframe; and
        determining, by the network device, the first TBS according to the S;
    performing, by the network device according to the first TBS or the second TBS, modulation and coding on the data carried in the first subframe and data carried in the second subframe, wherein the first subframe and the second subframe are adjacent subframes; and
    sending, by the network device, the first subframe and the second subframe to the user equipment, wherein the first subframe is sent after the second subframe, wherein the first subframe comprises M orthogonal frequency division multiplexing (OFDM) symbols, wherein the second subframe comprises N OFDM symbols, wherein M and N are positive integers, and wherein M≥N.

2. The method according to claim 1, wherein determining the second TBS comprises:
    determining, by the network device according to a third formula $L=F(l \times b)$, a quantity of PRBs occupied by the data carried in the second subframe (L), wherein l is the quantity of PRBs occupied by the data carried in the first subframe, and wherein b is a positive real number not greater than one;
    determining, by the network device, the TBS in the second subframe according to the L; and
    determining, by the network device, the TBS in the first subframe according to the quantity of PRBs occupied by the data carried in the first subframe.

3. The method according to claim 2, wherein b is $M_1/M_2$, wherein $M_1$ indicates a quantity of PRBs or a quantity of OFDM symbols occupied by the data carried in the second subframe or control information carried in the second subframe, and wherein $M_2$ indicates a quantity of PRBs or a quantity of OFDM symbols occupied by the data carried in the first subframe or control information carried in the first subframe.

4. The method according to claim 3, further comprising sending, by the network device, b to the user equipment.

5. The method according to claim 3, wherein determining the first TBS or the second TBS comprises:
creating, by the network device, a first table according to b, wherein the first table is created for either the TBS in the first subframe and the TBS in the second subframe, the TBS in the first subframe and the first TBS, the quantity of PRBs occupied by the data carried in the first subframe and the quantity of PRBs occupied by the data carried in the second subframe, or the quantity of PRBs occupied by the data carried in the first subframe and the quantity of PRBs jointly occupied by the data carried in the first subframe and the data carried in the second subframe; and
determining, by the network device, the first TBS or the second TBS according to the first table.

6. The method according to claim 1, wherein determining the second TBS comprises determining, by the network device, the second TBS according to a fourth formula P=F (p×b), wherein P is the second TBS, wherein p is the TBS in the first subframe, wherein the TBS in the first subframe is a TBS corresponding to the quantity of PRBs occupied by the data carried in the first subframe, and wherein b is a positive real number not greater than one.

7. The method according to claim 1, wherein the second subframe is a subframe on an unlicensed spectrum.

8. The method according to claim 1, wherein downlink control information (DCI) of the first subframe comprises a modulation and coding parameter indicating the data carried in the first subframe, and wherein the modulation and coding parameter of the data carried in the first subframe comprises a modulation and coding scheme (MCS) level of the data carried in the first subframe, the quantity of PRBs occupied by the data carried in the first subframe, and locations of the PRBs occupied by the data carried in the first subframe.

9. The method according to claim 8, wherein the DCI of the first subframe further comprises a modulation and coding parameter indicating the data carried in the second subframe, and wherein the modulation and coding parameter of the data carried in the second subframe comprises an MCS level of the data carried in the second subframe, a quantity of PRBs occupied by the data carried in the second subframe, and locations of the PRBs occupied by the data carried in the second subframe.

10. The method according to claim 1, further comprising receiving, by the network device, first feedback information from the user equipment, and wherein the first feedback information indicates whether the user equipment correctly receives the first subframe and the second subframe.

11. A method, comprising:
receiving, by user equipment, a first subframe and a second subframe adjacent to each other from a network device, wherein the first subframe is sent after the second subframe, wherein the first subframe comprises M orthogonal frequency division multiplexing (OFDM) symbols, wherein the second subframe comprises N OFDM symbols, wherein M and N are positive integers, and wherein M≥N;
obtaining, by the user equipment, a quantity of physical resource blocks (PRBs) occupied by data carried in the first subframe, wherein the data carried in the first subframe is received from the network device;
determining, by the user equipment, a first transport block size (TBS) or a second TBS according to the quantity of PRBs occupied by the data carried in the first subframe, wherein the second TBS comprises a TBS in the first subframe and a TBS in the second subframe, wherein determining the first TBS comprises:
determining, by the network device according to a first formula S=F (s×a), a quantity of PRBs jointly occupied by the data carried in the first subframe and the data carried in the second subframe (S), wherein s is the quantity of PRBs occupied by the data carried in the first subframe, wherein the function F is used for performing rounding up, rounding down, or rounding off, wherein a is a real number greater than one and corresponds to $(M_1+M_2)/M_2$, wherein $M_1$ indicates a quantity of PRBs or a quantity of OFDM symbols occupied by the data carried in the second subframe or control information carried in the second subframe, and wherein $M_2$ indicates a quantity of PRBs or a quantity of OFDM symbols occupied by the data carried in the first subframe or control information carried in the first subframe; and
determining, by the network device, the first TBS according to the S; and
performing, by the user equipment according to the first TBS or the second TBS, demodulation and decoding on the data carried in the first subframe and data carried in the second subframe.

12. User equipment, comprising:
a receiver configured to receive, from a network device, a first subframe and a second subframe that is adjacent to the first subframe, wherein the first subframe is sent after the second subframe, wherein the first subframe comprises M orthogonal frequency division multiplexing (OFDM) symbols, wherein the second subframe comprises N OFDM symbols, wherein M and N are positive integers, and wherein M≥N, and
a processor coupled to the receiver and configured to:
obtain a quantity of physical resource blocks (PRBs) occupied by data carried in the first subframe, wherein the data carried in the first subframe is from the network device to the user equipment;
determine a first transport block size (TBS) or a second TBS according to the quantity of PRBs occupied by the data carried in the first subframe, wherein the second TBS comprises a TBS in the first subframe and a TBS in the second subframe, wherein the processor is configured to determine first TBS by:
determining, according to a first formula S=(F×a), a quantity of PRBs jointly occupied by the data carried in the first subframe and the data carried in the second subframe (S), wherein s is the quantity of PRBs occupied by the data carried in the first subframe, wherein the function F is used for performing rounding up, rounding down, or rounding off, wherein a is a real number greater than one and corresponds to $(M_1+M_2)/M_2$, wherein $M_1$ indicates a quantity of PRBs or a quantity of OFDM symbols occupied by the data carried in the second subframe or control information carried in the second subframe, and wherein $M_2$ indicates a quantity of PRBs or a quantity of OFDM symbols occupied by the data carried in the first subframe or control information carried in the first subframe; and
determining the first TBS according to the S; and perform, according to the first TBS or the second TBS, demodulation and decoding on the data carried in the first subframe and data carried in the second subframe.

13. The user equipment according to claim 12, wherein the processor is further configured to:
    determine, according to a third formula L=F(l×b), a quantity of PRBs occupied by the data carried in the second subframe (L), wherein l is the quantity of PRBs occupied by the data carried in the first subframe, and wherein b is a positive real number not greater than one;
    determine the TBS in the second subframe according to the L; and
    determine the TBS in the first subframe according to the quantity of PRBs occupied by the data carried in the first subframe.

14. The user equipment according to claim 12, wherein the processor is further configured to determine the second TBS according to a fourth formula P=F(p×b), wherein P is the second TBS, wherein p is the TBS in the first subframe, wherein the TBS in the first subframe is a TBS corresponding to the quantity of PRBs occupied by the data carried in the first subframe, and wherein b is a positive real number not greater than one.

15. The user equipment according to claim 12, wherein the receiver is further configured to receive a from the network device, and wherein the processor is further configured to:
    create a first table according to a, wherein the first table is either for the TBS in the first subframe and the TBS in the second subframe, the TBS in the first subframe and the first TBS, the quantity of PRBs occupied by the data carried in the first subframe and the quantity of PRBs occupied by the data carried in the second subframe, or the quantity of PRBs occupied by the data carried in the first subframe and the quantity of PRBs jointly occupied by the data carried in the first subframe and the data carried in the second subframe; and
    determine the first TBS or the second TBS according to the first table.

* * * * *

UNITED STATES PATENT AND TRADEMARK OFFICE
CERTIFICATE OF CORRECTION

PATENT NO. : 10,608,804 B2  
APPLICATION NO. : 15/544820  
DATED : March 31, 2020  
INVENTOR(S) : Da Wang and Jian Wang Page 1 of 1

It is certified that error appears in the above-identified patent and that said Letters Patent is hereby corrected as shown below:

In the Claims

Claim 12, Column 38, Line 50: "S=(F×a)" should read "S=F(s × a)"

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*